United States Patent
Nurminen et al.

(10) Patent No.: US 11,346,567 B2
(45) Date of Patent: May 31, 2022

(54) ANALYZING PRESSURE DATA FROM A STATIONARY MOBILE DEVICE TO DETECT THAT A STATE OF AN AIR-CONDITIONING SYSTEM HAS CHANGED

(71) Applicant: HERE GLOBAL B.V., Eindhoven (NL)

(72) Inventors: Henri Jaakko Julius Nurminen, Tampere (FI); Lauri Aarne Johannes Wirola, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 183 days.

(21) Appl. No.: 16/743,449

(22) Filed: Jan. 15, 2020

(65) Prior Publication Data

US 2021/0215364 A1   Jul. 15, 2021

(51) Int. Cl.
*F24F 11/30*   (2018.01)
*F24F 110/40*   (2018.01)
(Continued)

(52) U.S. Cl.
CPC .......... *F24F 11/30* (2018.01); *F24F 2110/40* (2018.01); *G01C 5/06* (2013.01); *G01S 5/0252* (2013.01)

(58) Field of Classification Search
CPC ......... F24F 11/30; F24F 2110/40; G01C 5/06; G01C 21/206; G01S 5/0252; H04W 4/027; H04W 4/33
See application file for complete search history.

(56) References Cited

U.S. PATENT DOCUMENTS

| 10,083,408 B2 | 9/2018 | Magori | |
| 2011/0155200 A1* | 6/2011 | Simka | H01L 35/30 136/205 |

(Continued)

FOREIGN PATENT DOCUMENTS

| CN | 107637104 A * | 1/2018 | ............. H04L 67/12 |
| EP | 3851790 A1 | 7/2021 | |

(Continued)

OTHER PUBLICATIONS

Nurminen, EPA No. 19155424.5, filed Feb. 5, 2019, "Determining of Absolute Altitudes of Floors of a Structure".

(Continued)

*Primary Examiner* — Tung S Lau
(74) *Attorney, Agent, or Firm* — HERE Technologies; Michael Krasniansky

(57) ABSTRACT

Disclosed is an approach for detecting that a state of an air-conditioning system in a building has changed and ultimately determining the air-conditioning system's operating pattern, which could help improve collection and/or use of crowdsourced data for an indoor positioning solution and thus lead to more accurate position estimates. According to the disclosed approach, while a mobile device is in the building, processor(s) may detect that the mobile device is stationary and may responsively (i) cause the mobile device to provide pressure data representing air pressure in the building while the mobile device is stationary and (ii) subsequently receive the pressure data from the mobile device. And based on the pressure data indicating a pressure change and representing air pressure in the building while the mobile device is stationary, processor(s) may detect that a state of the air-conditioning system in the building has changed.

18 Claims, 12 Drawing Sheets

(51) Int. Cl.
*G01C 5/06* (2006.01)
*G01S 5/02* (2010.01)

(56) References Cited

U.S. PATENT DOCUMENTS

| | | |
|---|---|---|
| 2014/0135040 A1 | 5/2014 | Edge et al. |
| 2014/0323160 A1 | 10/2014 | Venkatraman et al. |
| 2015/0247917 A1 | 9/2015 | Gum et al. |
| 2015/0338314 A1 | 11/2015 | Meyer |
| 2016/0066151 A1 | 3/2016 | Palanki et al. |
| 2016/0169670 A1 | 6/2016 | Karvounis et al. |
| 2017/0280301 A1 | 9/2017 | Chang et al. |
| 2017/0287335 A1 | 10/2017 | Ansari |
| 2018/0206078 A1 | 7/2018 | Venkatraman et al. |
| 2018/0206096 A1 | 7/2018 | Sharma et al. |
| 2018/0252521 A1 | 9/2018 | Dormody et al. |
| 2018/0255431 A1 | 9/2018 | Robertson et al. |
| 2018/0259212 A1 | 9/2018 | Guiyuan et al. |
| 2018/0359112 A1 | 12/2018 | Lee et al. |
| 2019/0025062 A1 | 1/2019 | Young et al. |
| 2019/0124476 A1 | 4/2019 | Blaha et al. |
| 2019/0309968 A1 | 10/2019 | Nalajala et al. |
| 2019/0309975 A1 | 10/2019 | Salem et al. |
| 2019/0317179 A1 | 10/2019 | Dormody et al. |
| 2019/0323823 A1 | 10/2019 | Atchison et al. |
| 2019/0360886 A1* | 11/2019 | Dormody .............. G01L 27/002 |
| 2019/0364385 A1 | 11/2019 | Dormody et al. |
| 2020/0249026 A1 | 8/2020 | Ivanov et al. |
| 2020/0292318 A1 | 9/2020 | Nurminen et al. |

FOREIGN PATENT DOCUMENTS

| | | | |
|---|---|---|---|
| EP | 3851791 A1 | 7/2021 | |
| EP | 3852399 A1 | 7/2021 | |
| WO | WO 03081012 A1 * | 10/2003 | .............. F02G 5/00 |
| WO | 2017/175227 A1 | 10/2017 | |
| WO | 2019/228605 A1 | 5/2018 | |
| WO | 2018/134586 A1 | 7/2018 | |
| WO | 2019110118 A1 | 6/2019 | |
| WO | WO2019110118 A1 | 6/2019 | |
| WO | WO 2019226225 A1 * | 11/2019 | ............. G01C 25/00 |
| WO | WO2019226225 A1 | 11/2019 | |

OTHER PUBLICATIONS

Wirola, U.S. Appl. No. 16/743,423, filed Jan. 15, 2020, "Analyzing a Mobile Device's Movement Pattern During a Pressure Change To Detect That a State of an Air-Conditioning System Has Changed".

Wirola, U.S. Appl. No. 16/743,469, filed Jan. 1, 2020, "Analyzing Sets of Altitude Data From Mobile Device Groups to Detect That a State of an Air-Conditioning System Has Changed".

Extended European Search Report from corresponding EP Application No. 21151380.9-1001, dated Jun. 8, 2021 (8 pps.).

Extended European Search Report from corresponding EP Application No. 21151378.3-1213, dated May 12, 2021 (8 pps.).

Extended European Search Report from corresponding EP Application No. 21151376.7-1001, dated Jun. 21, 2021 (9 pps.).

* cited by examiner

ANALYZING PRESSURE DATA FROM A STATIONARY MOBILE DEVICE TO DETECT THAT A STATE OF AN AIR-CONDITIONING SYSTEM HAS CHANGED

FIELD OF THE DISCLOSURE

Embodiments of the present disclosure relate to the field of indoor positioning technologies, and more specifically to methods and systems for detecting that a state of an air-conditioning system has changed, which in turn could help improve positioning performance as further described herein.

BACKGROUND

In practice, indoor positioning technologies could provide for numerous benefits, such as by enabling indoor navigation and/or tracking of assets inside of buildings, among other possibilities. Generally speaking, an indoor positioning solution can be commercially successful if it is globally scalable, has low deployment and maintenance costs, and offers an acceptable end-user experience. To facilitate this, the solution could be based on existing infrastructure in buildings and on existing capabilities in consumer devices, such as on radio (e.g., Wi-Fi and/or Bluetooth) technologies that are already supported in numerous consumer devices on the market.

One approach for such radio-based indoor positioning could involve crowdsourced collection of data from mobile devices (e.g., data representing measurements of radio signals respectively observed by the mobile devices), which may then be used for generating radio map(s). A radio map may effectively model a radio environment in an indoor area, and could enable an entity (e.g., a server or a mobile device) to determine characteristics of radio signals that are expected to be observable respectively at different locations in the indoor area. Given this, the entity could compare further (e.g., radio) measurements from a mobile device to the radio map, to estimate a position of the mobile device in the indoor area.

The crowdsourcing process could involve collection of altitude data from mobile devices in a building, which would be particularly beneficial for enabling a three-dimensional (3D) indoor positioning solution. Typically, due to structures of multi-level buildings, radio measurements (e.g., received signal strengths) in a horizontal location of an indoor area may vary significantly as a function of altitude/floor level. Given this, the crowdsourcing process may involve collection of altitude data from mobile devices, which may represent absolute and/or relative altitude(s) and/or may take the form of pressure data representing pressure measurements useful for determining such altitude(s). For instance, a mobile device could provide a "fingerprint" to a server configured to generate a radio map, the fingerprint including radio measurement(s) by the mobile device and altitude data representing an altitude of the mobile device substantially during the radio measurement(s). As such, the server could associate certain altitude data with certain radio measurements, so as to generate a radio map that accurately represents characteristics of radio signals expected to be observable respectively at different attitudes/floors of an indoor area, which in turn could enable accurate positioning estimations, e.g., in a multi-level building.

Although the above-described crowdsourcing process could help quickly build global coverage, there are various technical challenges associated with such a process. For instance, altitude data collected during the crowdsourcing process may sometimes be inaccurate, thereby potentially leading to generation of an inaccurate radio map and ultimately to inaccurate position estimates, which is problematic. Often, such inaccuracies may arise due to collection of crowdsourced data taking place while an air-conditioning system in a building is off.

More specifically, a barometer is typically relied upon to provide altitude data in the crowdsourcing process, because it is the only sensor that can ubiquitously provide information related to device altitude changes in consumer mobile devices. Generally, a barometer is configured to measure atmospheric (air) pressure in the environment. And because air pressure outdoors changes with altitude in a predictable manner (e.g., according to the well-known barometric formula), the barometer's pressure measurement(s) could be used for estimating altitude(s) of a mobile device.

Unfortunately, although the predictable relationship between pressure and altitude changes typically holds true in an outdoor environment, it does not always hold true in an indoor environment. In particular, the stack effect (also known as the chimney effect) relates to movement of air into and out of building due to a difference in air density between the inside and outside of the building. This difference in air density could result from temperature (e.g., heat) and/or moisture differences, among other possibilities. In any case, the stack effect may be problematic, because it may cause (i) indoor pressure in lower floors of a building to be lower than the pressure outdoors, and (ii) indoor pressure in higher floors of the building to be higher than the pressure outdoors, thereby leading an abnormal relationship between pressure and altitudes changes inside of the building (e.g., an abnormal vertical pressure gradient). Because this relationship may be abnormal, a barometer could inadvertently provide inaccurate altitude data inside of the building (e.g., due to pressure measurements that are unexpected at a given altitude of the mobile device).

Although the stack effect could present some issues, it is often possible to effectively remove the stack effect through use of an air-conditioning system in a building. When an air-conditioning system in a building is on, the pressure difference between the inside of the building and the outside of the building is kept either negative (the inside of the building has a lower pressure than the outside of the building) or positive (the inside of the building has a higher pressure than the outside of the building). This effectively removes the abnormal vertical pressure gradient that is caused by the stack effect, thereby makes the relationship between pressure and altitude inside of the building more predictable. As a result, a barometer is likely to provide more accurate altitude data when an air-conditioning system in a building is on compared to the altitude data it would provide when the air-conditioning system is off.

Given this, altitude data that is collected when an air-conditioning system in a building is on may be considered to be more accurate, reliable, and trustworthy. Thus, during the described crowdsourcing process, it would be more beneficial to collect data when the air-conditioning system is on, rather than off.

At issue then is how to automatically detect that a state of an air-conditioning system has changed (e.g., that the air-conditioning system has been switched on or off) A technical solution for accurately detecting the change at issue could help give rise to a globally scalable and high-definition 3D indoor positioning technology.

SUMMARY

Disclosed herein are various approaches for detecting that a state of an air-conditioning system in a building has changed (e.g. that the air-conditioning system has been switched on or switched off). One or more of these approaches could be applied to determine an operating pattern of the air-conditioning system over time, which may indicate times when the air-conditioning system has been and/or is expected to be on as well as times when the air-conditioning system has been and/or is expected to be off. Understanding this operating pattern could ultimately help improve accuracy of position estimates in an indoor positioning solution, as described herein.

Typically, when an air-conditioning system is switched on or off, such an event shows up as an abrupt pressure change in pressure-based altitude reading(s) by a barometer (e.g., in a mobile device). So, as an initial matter, at question is how to distinguish between (i) a pressure change resulting from a change in the state of the air-conditioning system and (ii) a pressure change resulting from a change in altitude/floor by a mobile device.

The first approach may involve analyzing a mobile device's movement pattern during a pressure change to help make the distinction at issue, which could in turn help detect that a state of the air-conditioning system has changed. According to the first approach, an entity (e.g., a server) could receive (i) movement data (e.g., from inertial sensor(s) of a mobile device) indicating a movement pattern of the mobile device as well as (ii) pressure data (e.g., from a barometer of the mobile device) indicating a pressure change. In some cases, such data might be received as part of the crowdsourcing process, which means that the first approach could advantageously rely on data that would have been collected anyways during the crowdsourcing process. In any case, if the entity makes a determination that the movement pattern does not indicate a substantial change in altitude of the mobile device during the pressure change, this may serve as an indication that the pressure change occurred due to a change in the state of the air-conditioning system, thereby enabling detection of this state change based on the determination.

In contrast, the second approach may involve analyzing pressure data from a stationary mobile device to detect that a state of an air-conditioning system has changed. Typically, when pressure data is collected from the mobile device during the crowdsourcing process, it is collected when the mobile device has been detected as moving. But in this second approach, the entity could cause the mobile device to provide pressure data representing air pressure in the building while the mobile device is stationary, thereby effectively changing the data collection logic and collecting pressure data outside of the crowdsourcing process. And because an altitude of a mobile device is unlikely to change while the mobile device is stationary, this means that any pressure change detected while the mobile device is stationary may result from a change in the state of the air-conditioning system. As such, if the pressure data indicates a pressure change and represents air pressure in the building while the mobile device is stationary, the entity could use this information to detect the state change in the state of the air-conditioning system.

Although the first and second approaches, alone or in combination, can provide for numerous benefits as described, also disclosed herein is a third approach that may involve analyzing sets of altitude data collected from mobile device groups to detect that a state of an air-conditioning system in a building has changed.

In practice, different groups of mobile devices may provide sets of altitude data (e.g., over the course of a given day) respectively over different time periods e.g., as part of the crowdsourcing process. Each such set of altitude data could be used (perhaps in combination with other data) respectively as basis to generate a floor model of the building, which could indicate respective altitude(s) of floors and/or the number of floors in the building, among other options.

Given this, an entity could generate a floor model respectively for each set of altitude data collected from one of the groups of mobile devices over a given time period. And if one of the generated floor models is substantially different from the rest (e.g., indicates a different number of floors and/or floors altitudes compared to the other generated floor models), this may serve as an indication that the set of altitude data used for generating the floor model at issue may have at least some inaccurate altitude data, possibly due to a change in the state of the air-conditioning system during the particular time period when this set of altitude data was collected. As such, the entity could detect that the state of the air-conditioning system changed during the particular time period based on a determination that the floor model at issue is different compared to the others.

Advantageously, because the disclosed approaches could allow for an improved understanding of an air-conditioning system's operating pattern, an entity could control collection of crowdsourced data in the building to ensure that more accurate data is collected and/or could discard data that is deemed to be inaccurate. For instance, the entity could cause crowdsourced collection of data in the building to occur only when the air-conditioning system has been detected as being on or is otherwise expected to be on. Additionally or alternatively, the entity could generate or update a radio map based on data that has been collected while the air-conditioning system is on, but may discard, disregard, and/or filter out data that has be has been collected while the air-conditioning system is off. In this way, the entity could generate more accurate radio map(s) and/or update existing radio map(s) for increased accuracy, thereby significantly improving accuracy of position estimates in an indoor positioning solution.

Accordingly, in one aspect, disclosed is a first method. The first method involves: receiving, by one or more processors, pressure data and movement data from a mobile device, where the received pressure data indicates a pressure change, and the received movement data indicates a movement pattern of the mobile device that occurred substantially during the pressure change; making a determination, by one or more processors, that the movement pattern lacks a substantial change in altitude of the mobile device during the pressure change; and based at least on the determination, detecting, by the one or more processors, that a state of an air-conditioning system in a building has changed.

In another aspect, disclosed is a second method. The second method involves: causing, by one or more processors, a mobile device to provide pressure data representing air pressure in a building while the mobile device is stationary; receiving, by the one or more processors, the pressure data from the mobile device, where the received pressure data indicates a pressure change; and based on the received pressure data indicating the pressure change and representing air pressure in the building while the mobile device is stationary, detecting, by the one or more processors, that a state of an air-conditioning system in the building has changed.

In yet another aspect, disclosed is a third method. The third method involves: receiving, by one or more processors, sets of altitude data respectively from groups of mobile devices located in a building, each set of altitude data being associated with a respective time period; determining, by the one or more processors, a plurality of floor models of the building respectively based at least on the sets of altitude data; making a determination, by the one or more processors, that at least one of the plurality of floor models is substantially different from other floor models of the plurality; and based at least on the determination, detecting, by the one or more processors, that a state of an air-conditioning system in the building has changed during one or more particular time periods, the one or more particular time periods being associated with one or more sets of altitude data that were used as basis to determine the at least one floor model.

In yet another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the first, second, and/or third methods, among others.

In yet another aspect, disclosed is a non-transitory computer readable medium having stored thereon instructions executable by one or more processors to cause a mobile device or a server device to perform operations. The operations may include any of those described herein, such as any of those set forth in the first, second, and/or third methods, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
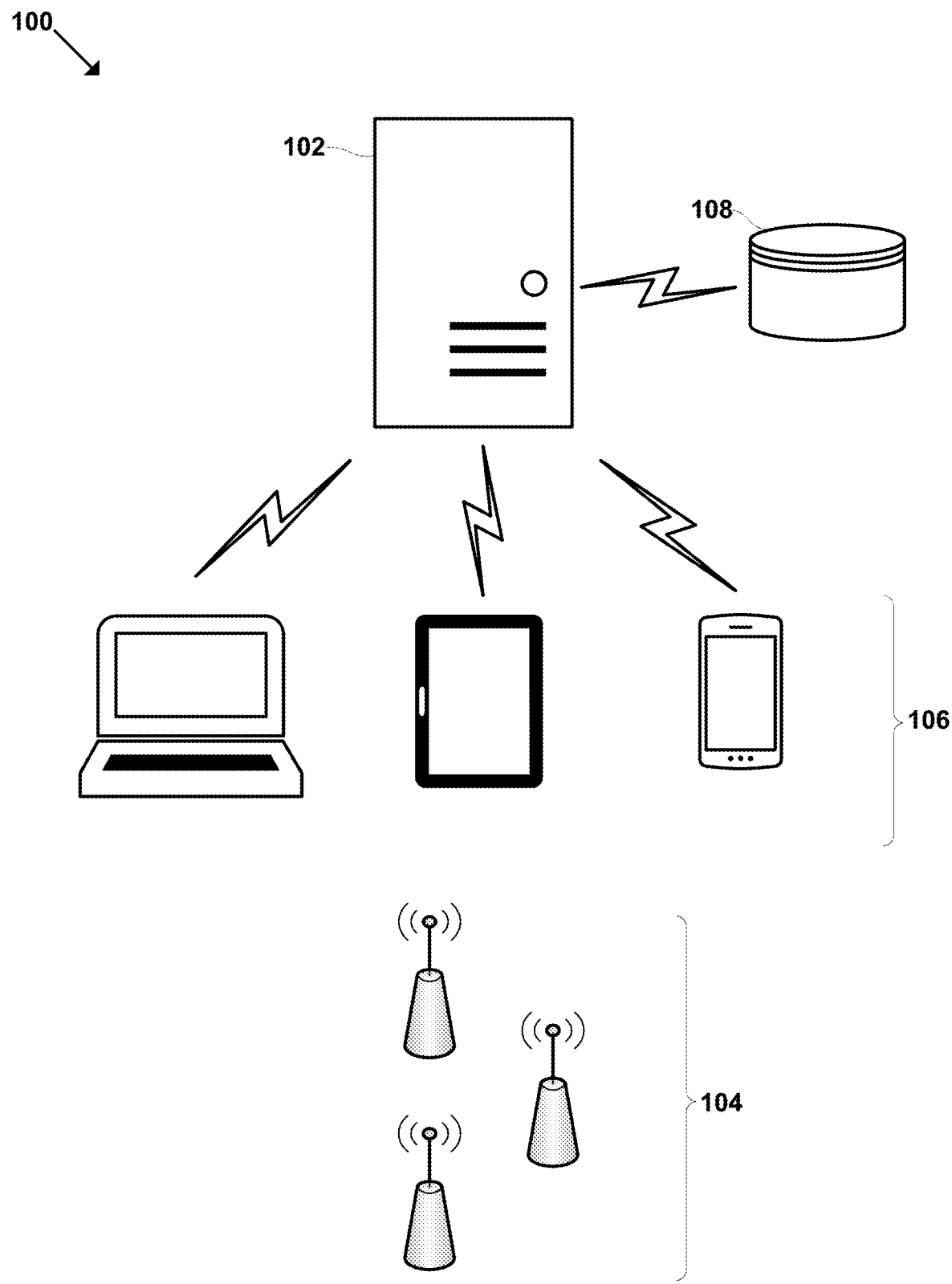
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. EXAMPLE POSITIONING SYSTEMS

Positioning methods that are seamless and available at all times might rely upon novel systems and solutions that are specifically developed and, if necessary, deployed for this purpose. Traditional positioning technologies, which are mainly used outdoors (e.g., satellite and cellular positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g. satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure in the buildings and on existing capabilities in the consumer devices. For example, the positioning solution could be based on technologies like Wi-Fi and/or Bluetooth, which are already supported in numerous devices, such as smartphones, tablets, laptops and even in the majority of the feature phones. Thus, it is advantageous to develop a positioning solution that uses cellular and/or non-cellular radio signals in a way that (i)

makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102, radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), and/or Long Term Evolution (LTE) base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning, for instance.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in a particular area, such as an indoor area (e.g., inside of a venue or other building).

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s).

A fingerprint collected from a given mobile device may contain or otherwise represent a position estimate and measurement(s) by the mobile device. The position estimate may be, for example, based on GNSS data, based on sensor data, based on previously collected radio measurements, and/or may be manually inputted (e.g., via a user interface), among other options. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for (e.g., horizontal) positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of e.g., a multi-level building.

Given this, collected fingerprint(s) could additionally or alternatively include altitude data representing or otherwise enabling determination of altitude(s) of mobile device(s). In particular, altitude data may represent absolute and/or relative altitude(s) of a mobile device. Alternatively, altitude data may take the form of pressure data representing pressure measurements that can then be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Additionally or alternatively, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example (and without limitation), the server system 102 could define a grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g. barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, at times when it is desired to reduce a load on the server system 102 (e.g., reduce the extent of processing by the server system 102), at times when the mobile device seeks to obtain a position estimate relatively quickly (e.g., a very short time-to-first-fix), and/or in other situations.

In either case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
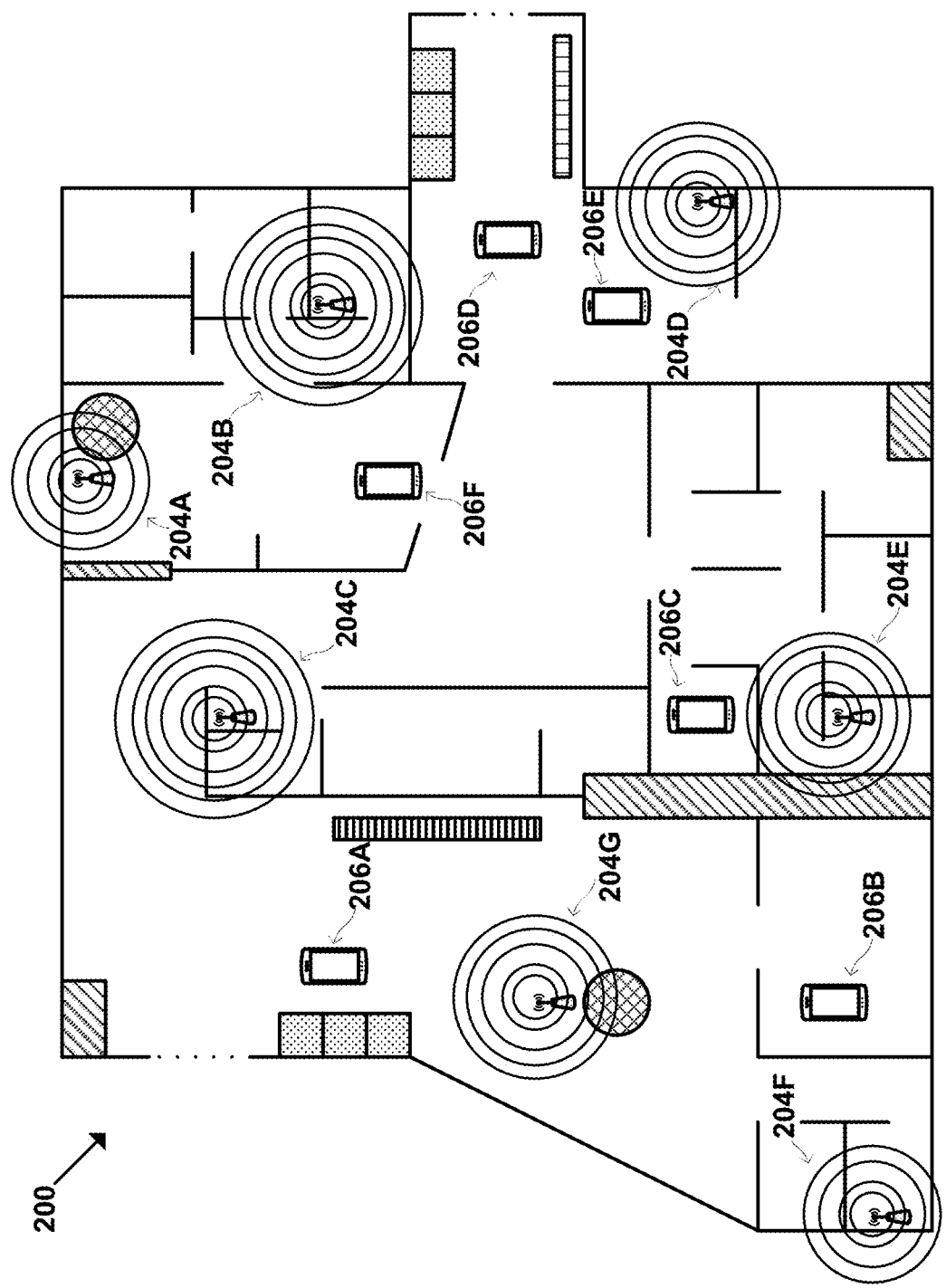
FIGS. 2A and 2B illustrate an indoor area at which radio device(s) and mobile device(s) can be located, in accordance with an example implementation.
Figure 2B:
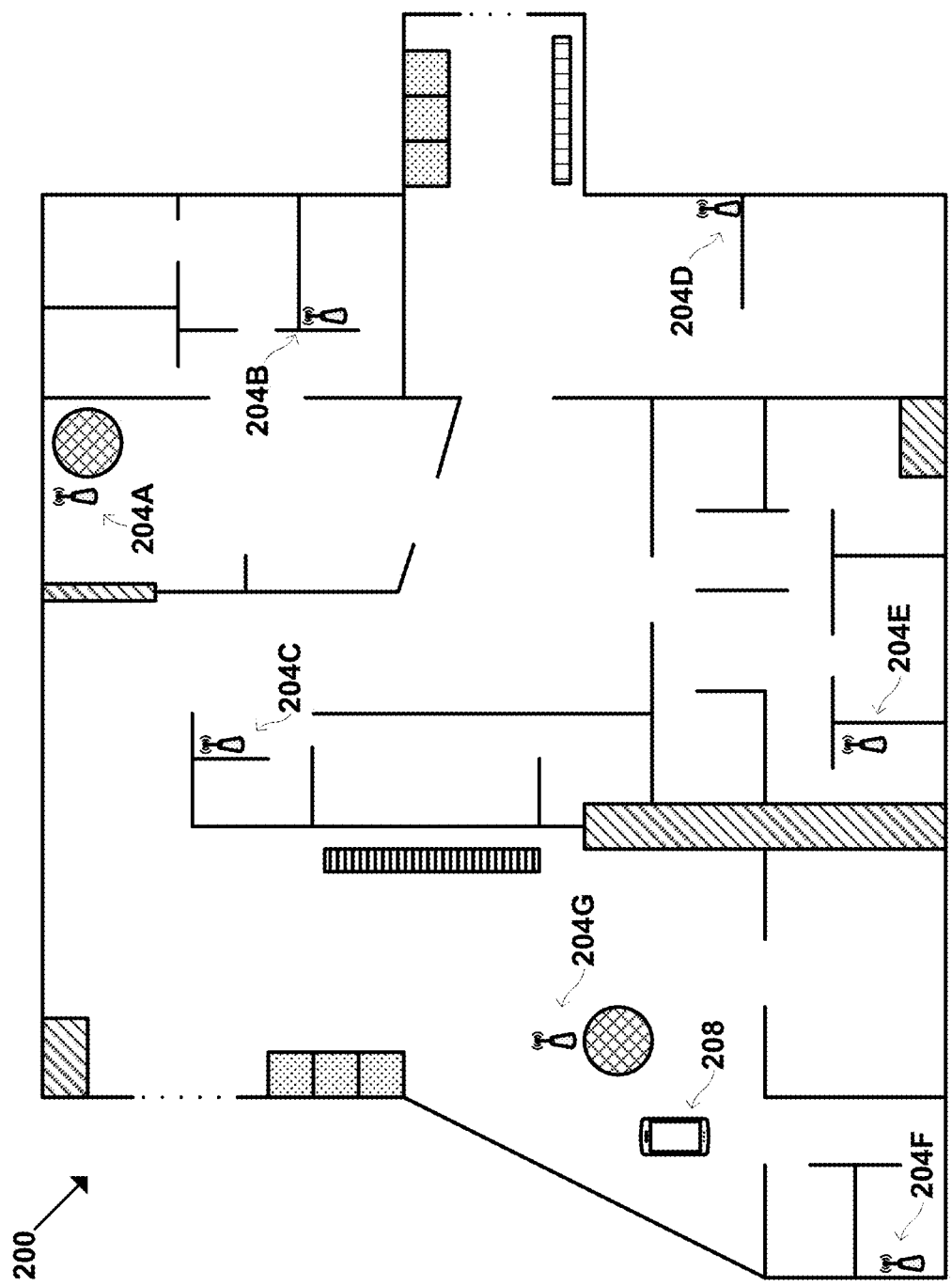
Figure 2C:
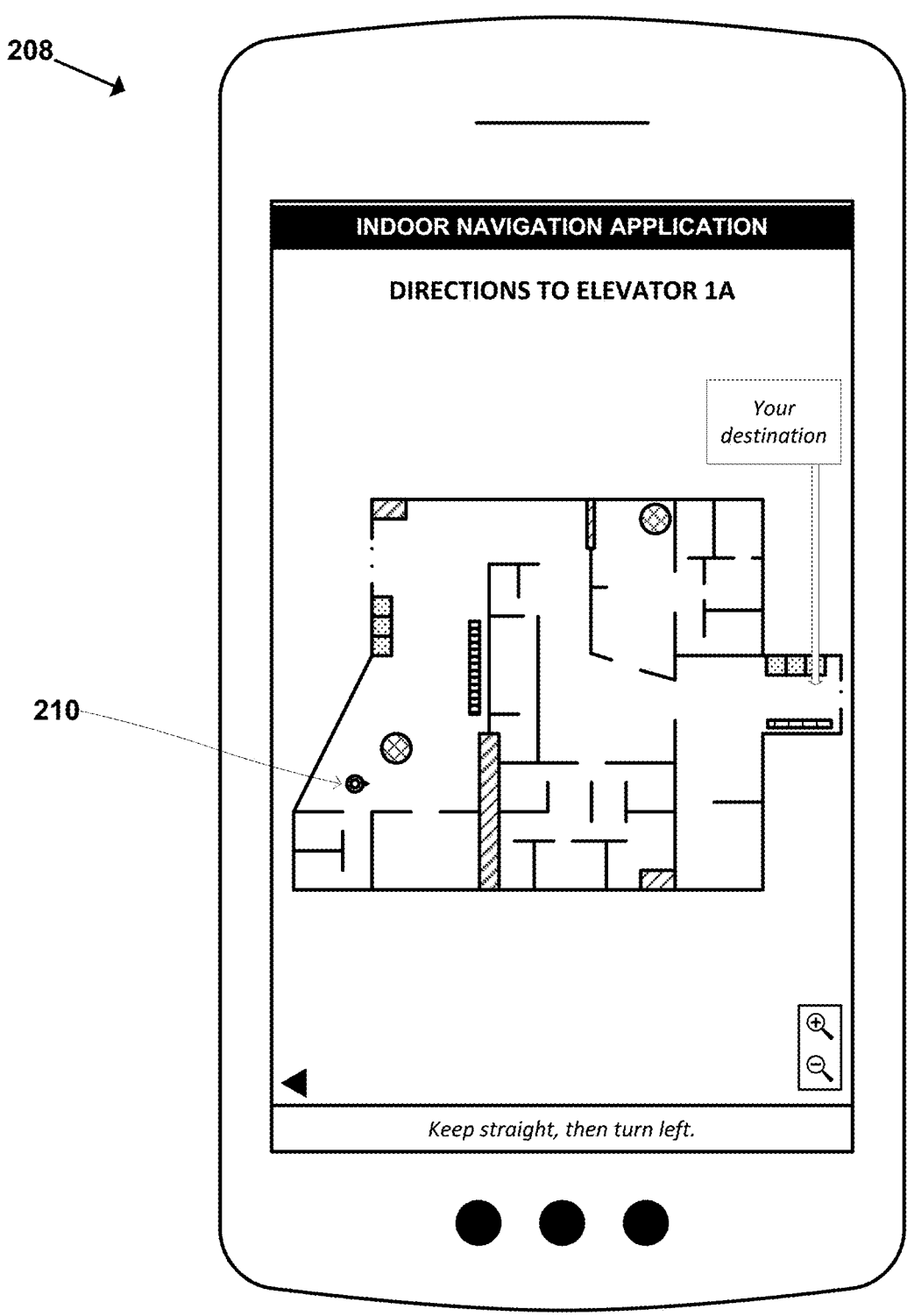
FIG. 2C illustrates an example indoor navigation application, in accordance with an example implementation.

FIGS. 2A to 2C next illustrate an example implementation and use of the above-described positioning solution.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G is shown to respectively emit radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. ILLUSTRATIVE METHODS

As noted above, the present disclosure is directed to various approaches for detecting that a state of an air-conditioning system has changed, which in turn could help improve positioning performance of an indoor positioning system.

Figure 3:
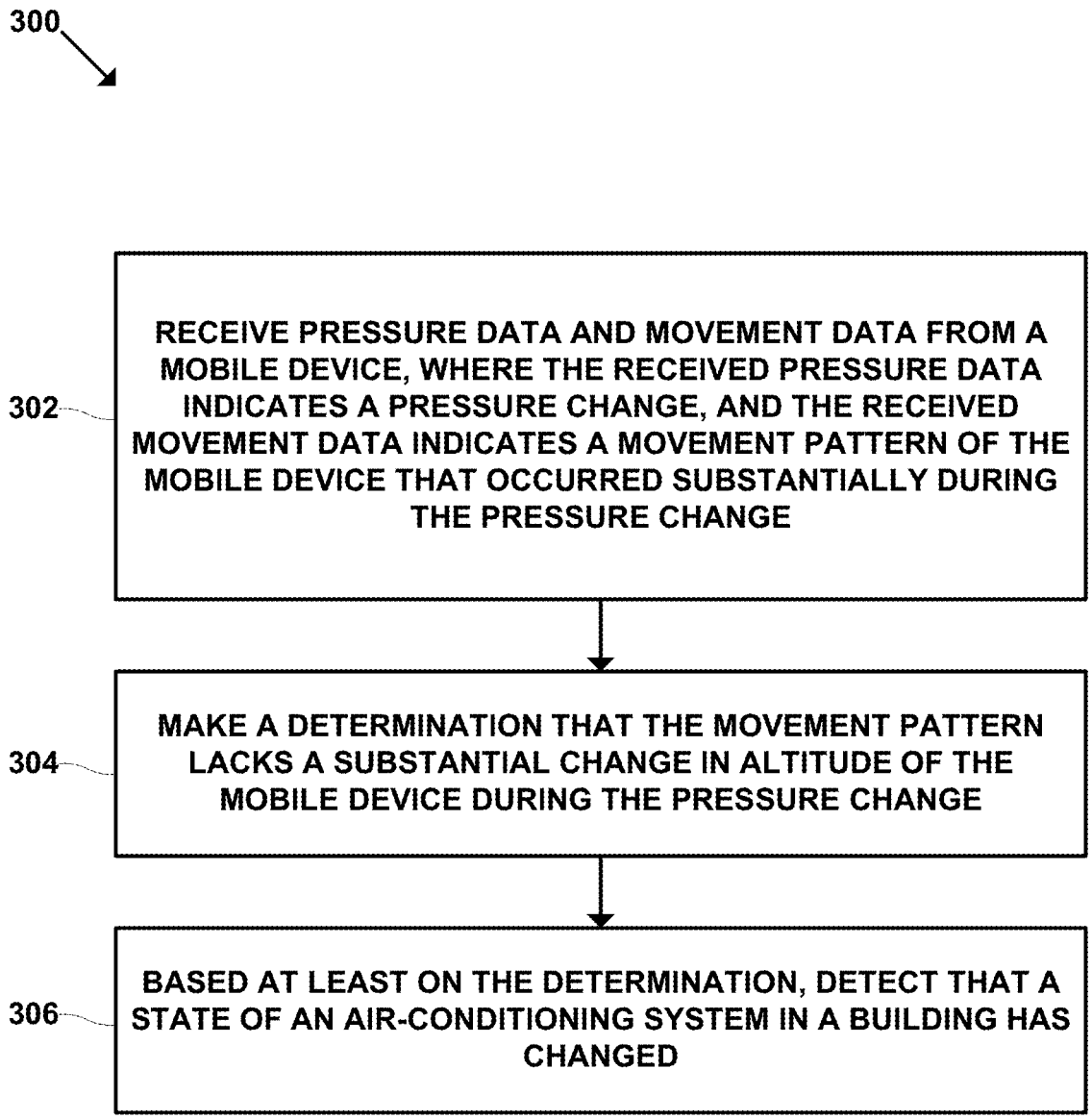
FIG. 3 is an example flowchart for a first approach to detect that a state of an air-conditioning system in a building has changed, in accordance with an example implementation.

Generally speaking, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in any feasible manner as understood by one of ordinary skill in the art currently and/or in the future without departing from the scope of the present disclosure.

i. First approach: Analyzing a Mobile Device's Movement Pattern During a Pressure Change to Detect that a State of an Air-Conditioning System has Changed FIG. 3 is a flowchart illustrating a method 300 for detecting that a state of an air-conditioning system has changed. Method 300 (and other process(es)/method(s) disclosed herein) could be performed by and/or in an arrangement involving a mobile device (e.g., one of the mobile devices 106) and/or a server device (e.g., server system 102) (or more particularly by component(s)/module(s) (e.g., processor(s)) thereof), among other possibilities. For sake of simplicity, however, method(s) are described herein as being performed by the server device.

In this regard, it should be understood that, if a method is performed by a given entity (e.g. a server device), the given entity could engage in communication(s) with one or more other entities (e.g., the mobile device) as necessary to obtain and/or provide any feasible information as understood by one of ordinary skill in the art, to enable the given entity to perform operations described herein and/or to inform another entity about results, among other possibilities. For example, a server device could perform the method 300 to detect that a state of an air-conditioning system has changed, and could then provide, to a mobile device, information indicating the detection at issue, or vice versa. Moreover, in some implementations, the various operations described herein could be distributed among one or more entities, such as in accordance with a client-server arrangement or the like. Other arrangements are also possible.

At block 302, method 300 may involve receiving pressure data and movement data from a mobile device, where the received pressure data indicates a pressure change, and the received movement data indicates a movement pattern of the mobile device that occurred substantially during the pressure change.

Generally, an air-conditioning system could also be referred to as AC, A/C, or air con, among other possibilities. Such an air-conditioning system could provide air, distribute air, control air flow in a space, and/or carry out any operations as understood by those of ordinary skill in the art. Given this, an air-conditioning system may have various uses, such as, e.g., removal of heat and/or moisture from a space, among other examples. Further, an air-conditioning system may be considered to be "on" when it is carrying out its intended function (e.g., providing air), and may be considered to be "off" when it is not carrying out that function. However, the air-conditioning system being on or off could be defined in any feasibly manner as understood by those of ordinary skill in the art. In any case, the air-conditioning system could be switched on or off manually, or may switch on or off according to a pre-arranged schedule, among other options.

In line with the discussion above, it may be beneficial to detect when an air-conditioning system is, was, and/or is expected to be on or off, to help improve positioning performance. To facilitate this, the first approach at issue may involve the server system collecting pressure and movement data from mobile device(s). In practice, the above-described crowdsourcing process may already include collection of such pressure and/or movement data, which means that the first approach could effectively leverage data that would have been collected anyways as part of the crowdsourcing process. In some implementations, however, at least some of this movement and/or pressure data could be collected outside of the crowdsourcing process.

When the server system receives pressure data from a mobile device, the pressure data could take various forms. For example, as discussed, the pressure data could be based on pressure measurements performed by barometer(s) of the mobile device. Also, the pressure data might indicate a pressure change, such as an increase or a decrease in pressure over a certain time period. At question is whether this pressure change occurred due to a change in altitude of the mobile device or due to a change in the state of the air-conditioning system.

In addition to receiving pressure data from the mobile device, the server system could also receive movement data from the mobile device. The server system could receive the movement data at substantially the same time that it receives the pressure data (e.g., in a single fingerprint). Alternatively, the server system could receive the movement data and pressure data respectively different times. In this case, the movement and pressure data could be, e.g., timestamped, so that the server system could determine that the movement and pressure data are both associated with the substantially the same time period.

In either case, the movement data may indicate a movement pattern of the mobile device substantially during (e.g., over the time period of) the pressure change. The movement pattern may provide information about direction of movement, horizontal and/or vertical acceleration/deceleration, speed of movement, and/or orientation, among other possibilities. Such information (e.g., represented by the movement data) could be in accordance with measurement(s) by inertial sensor(s) of the mobile device, which may include (but are not limited to) accelerometer(s), magnetometer(s), gyroscope(s), and/or inertial measurement unit(s) (IMU(s)), among other examples.

At block 304, method 300 may involve making a determination that the movement pattern lacks a substantial change in altitude of the mobile device during the pressure change.

According to the first approach, the server system may analyze the movement pattern to determine whether the mobile device's altitude changed significantly during the pressure change. If the mobile device's altitude did not change significantly during the pressure change, this may serve as an indication that the pressure change occurred due to a change in the state of the air-conditioning system, rather than due to vertical movement (or more specifically an altitude change) of the mobile device. On the other hand, if the mobile device's altitude did change significantly during the pressure change, this may serve as an indication that the pressure change occurred due to the mobile device's altitude change.

Given this, the determination of block 304 may enable gathering of various types of information. For example, the determination of block 304 may relate to determining that the mobile device's altitude did not change during the pressure change or changed by no more than a threshold amount (e.g., a threshold altitude change) during the pressure change, according to the mobile device's movement pattern. In another example, the determination of block 304 may relate to determining that the mobile device remained on the same floor during the pressure change, according to the mobile device's movement pattern. Other examples are also possible.

Generally, the server system could make the determination using any feasible analysis of the movement pattern. By way of example (and without limitation), the server system could make the determination by determining one or more of the following: (i) that the mobile device did not accelerate or decelerate vertically, (ii) that the mobile device accelerated or decelerated vertically by less than a threshold extent of acceleration/deceleration, (iii) that the mobile device's speed is within a particular range (e.g., a range of speeds expected during walking/running, but not on an elevator or escalator), (iv) that the movement pattern is indicative of movement on a substantially flat surface (e.g., rather than being indicative of movement on stairs), and/or (v) that the mobile device's direction of movement is not along a path set forth by a vertical connector (e.g., a stairwell, elevator, or escalator). Numerous other examples are also possible.

At block 306, method 300 may involve, based at least on the determination, detecting that a state of an air-conditioning system in a building has changed.

In line with the discussion above, analysis of the mobile device's movement pattern during the pressure change could help detect that the state of the air-conditioning system has changed. In particular, if the movement pattern indicates lack of a substantial change in altitude, this means that the pressure change likely did not occur due to the mobile device's movement, but rather due to a change in state of the air-conditioning system. Thus, if the server system makes the determination of block 304, the server system could advantageously use this determination as basis for the detection at issue.

In this regard, the server system could determine in various ways that the state of the air-conditioning system changed at a particular time or a particular time range. For example, because the pressure and/or movement data may be associated (e.g., timestamped) with particular time(s), such as the particular time range during which the pressure change occurred, the server system could use this timing information to determine that the state at issue changed during one or more of those time(s) (e.g., during the particular time range). Other examples are also possible.

Furthermore, the server system could determine in various ways whether the change in state of the air-conditioning system involves the air-conditioning system being switched on or being switched off.

For example, the server system could determine whether the above-mentioned pressure change is positive (e.g., a pressure increase) or negative (e.g., a pressure decrease). If the server system determines that the pressure change is positive, then the server system may determine that the air-conditioning system has been switched on. Whereas, if the server system determines that the pressure change is negative, then the server system may determine that the air-conditioning system has been switched off.

In another example, if the server system has a record indicating that the air-conditioning system is currently off and detects the that the state of the air-conditioning system changed, then the server system may use this information to determine that the air-conditioning system has been switched on. Similarly, if the server system has a record indicating that the air-conditioning system is currently on and detects the that the state of the air-conditioning system changed, then the server system may use this information to determine that the air-conditioning system has been switched off.

In yet another example, if the server system has information indicating an operating pattern of the air-conditioning system (e.g., determined according to the present disclosure and/or obtained in other ways), the server system could use this information to determine whether the detected change in state involved the air-conditioning system being switched on or off. For instance, the server system may determine that the change in state occurred at a certain time or time period (e.g., at night or over a weekend for an office building) and may also determine that the operating system indicates a particular state for such a time or time period (e.g., that the air-conditioning system is typically switched off at night and over weekend). Given this, the server system could determine that the detected change in state likely corresponds to the state indicated by the operating pattern (e.g., determine that change in state involved the air-conditioning system being switched off at night). Other examples are also possible.

In a further aspect, the server system could use data from other mobile device(s) in the building to verify the detection at issue, thereby ensuring it is trustworthy. In particular, the server system could perform the operations of block 302 and 304 with respect to one or more other mobile device(s) in the building, so as to analyze their respective movement patterns as described. And if the server system makes further determination(s) that their respective movement patterns also respectively lack a substantial change in altitude during the pressure change, the server system could use such further determination(s) as basis for verifying or otherwise detecting that the state of the air-conditioning system in the building changed. Other aspects are also possible.

In some implementations, the server system could additionally or alternatively detect that the state of the air-conditioning system has changed based on an on-board analysis by the mobile device. In particular, the above-described blocks 302 and 304 may involve the mobile device providing derivatives of pressure and/or movement-related data, in accordance with a programmatic analysis by the mobile device, and the derivatives may enable the detection at issue. For instance, the mobile device could make the determination that the movement pattern lacks a substantial change in altitude of the mobile device during the pressure change, and could then responsively provide (e.g., to the server system) an indication of such a mismatch between the pressure data and the movement-related data. In turn, the server system could use this indication as basis for detecting that the state of an air-conditioning system has changed. Other examples are also possible.

Figure 4:
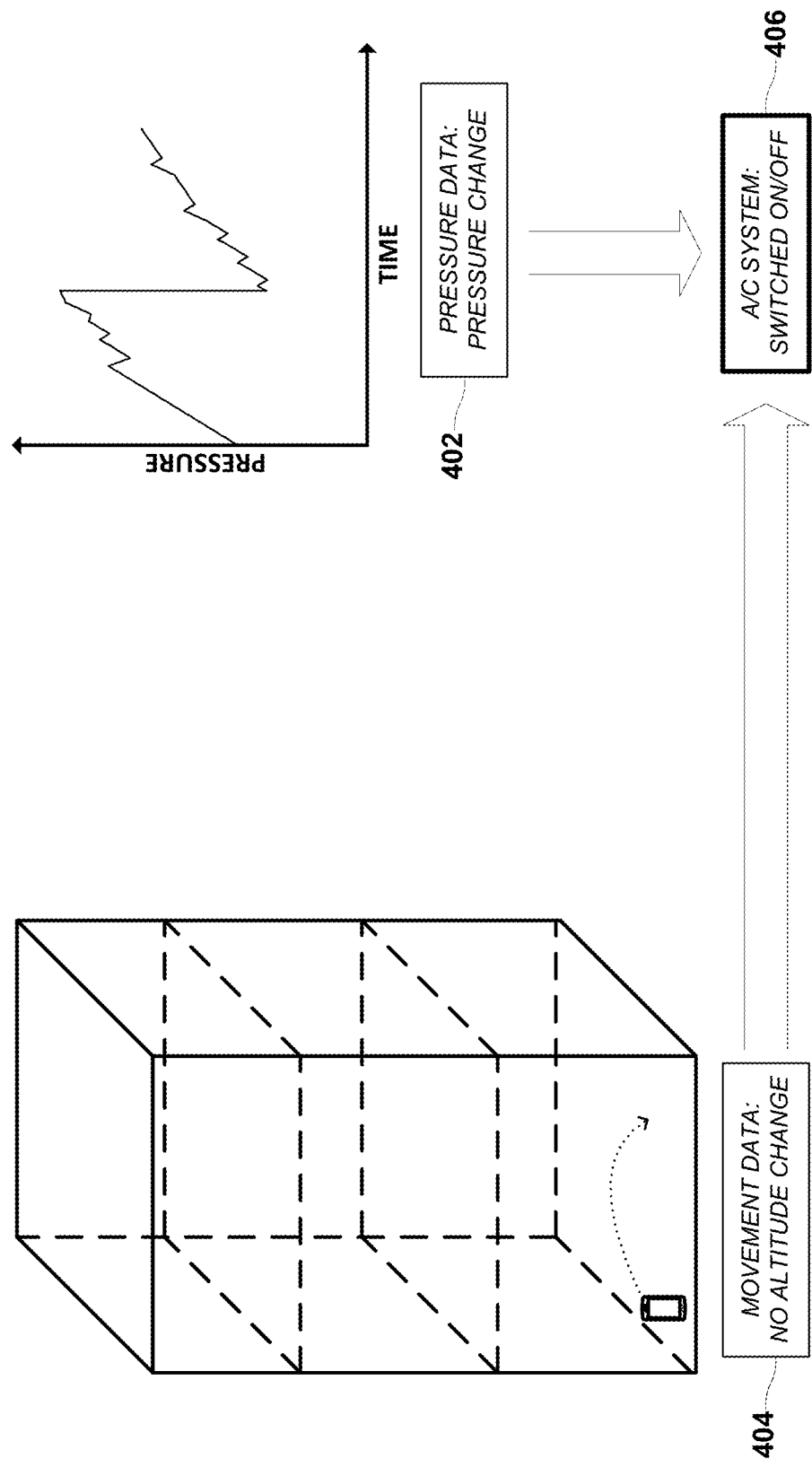
FIG. 4 illustrates the first approach for detecting that a state of an air-conditioning system in a building has changed, in accordance with an example implementation.
Figure 5:
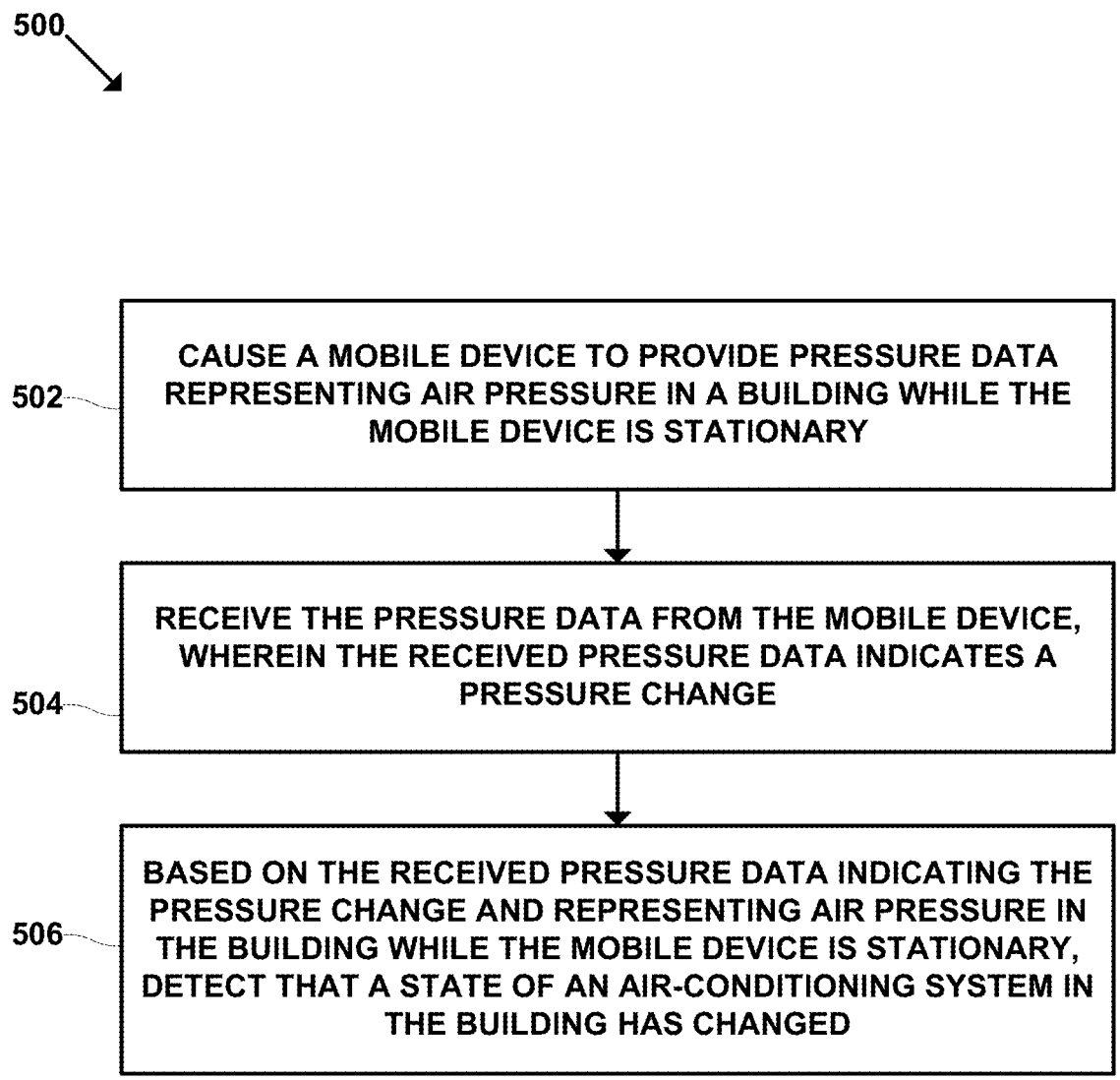
FIG. 5 is an example flowchart for a second approach to detect that a state of an air-conditioning system in a building has changed, in accordance with an example implementation.

FIG. 4 next visually illustrates the first approach for detecting that a state of an air-conditioning system in a building changed. As shown, pressure data 402 from a mobile device in the building may indicate a pressure change, and movement data 404 from the mobile device may indicate no change in altitude of the mobile device (during the pressure change). Given this pressure data 402 and movement data 404, a detection 406 can be made that the state of the air-conditioning system changed. Other illustrations are also possible.

ii. Second Approach: Analyzing Pressure Data from a Stationary Mobile Device to Detect that a State of an Air-Conditioning System has Changed FIG. 5 is a flowchart illustrating another method 500 for detecting that a state of an air-conditioning system has changed. Here again, for sake of simplicity, method 500 is described herein as being performed by a server system.

At block 502, method 500 may involve causing a mobile device to provide pressure data representing air pressure in a building while the mobile device is stationary. And at block 504, method 500 may involve receiving the pressure data from the mobile device, where the received pressure data indicates a pressure change.

While the above-described first approach may leverage data that would have been collected anyways as part of the crowdsourcing process e.g., when mobile device(s) are detected as moving, the second approach may effectively change this collection logic. In doing so, a server system could cause a mobile device to provide pressure data (e.g., outside of the crowdsourcing process) when it is detected as being stationary, rather than moving. In one case, the server system may engage in communication(s) with a mobile device to change the collection logic on-board the mobile device, so that the mobile device is configured to independently provide pressure data in response to the mobile device detecting that it is stationary. In another case, the server system may detect that the mobile device is stationary, and may responsively engage in communication(s) with the mobile device to cause the mobile device to provide the pressure data. In either case, the server system and/or the mobile device could detect that the mobile device is stationary in various ways.

For instance, a server system could receive movement data from a mobile device, such as upon request and/or in accordance with a pre-determined schedule, among other possibilities. In some cases, the movement data could take the form of an indication (e.g., a binary value) provided by the mobile device to indicate whether it is stationary or moving. In other cases, the movement data may represent information about movement of the mobile device in accordance with measurement(s) by inertial sensor(s) of the mobile device. As discussed, such inertial sensor(s) may include (but are not limited to) accelerometer(s), magnetometer(s), gyroscope(s), and/or inertial measurement unit(s) (IMU(s)) etc.

Generally, the server system could determine that the mobile device is stationary using any feasible analysis of the movement data. By way of example (and without limitation), the server system could determine that the mobile device is stationary by determining one or more of the following: (i) that the mobile device's speed is substantially zero, (ii) that the mobile device is not accelerating or decelerating, (iii) that the mobile device's orientation has remained the same for at least a threshold time period, and/or (iv) that the mobile device's direction of movement is unknown. Numerous other examples are also possible.

When the server system causes mobile device(s) to provide pressure data, the server system could control collection time(s) and/or collection duration. For example, the server system could apply a pseudo-random process to determine times during which to respectively cause mobile device(s) to provide pressure data. And if a mobile device is detected to be stationary during one of those times, then the server system could cause mobile device to provide pressure data at those time(s) (i.e., in accordance with application of the pseudo-random process). In this regard, the determined times could collectively amount to a particular collection duration (e.g., 10 minutes of "static" pressure data collection per day). Given this, the server system could cause mobile device(s) to provide pressure data for respective time periods, which may collectively amount to the particular collection duration at issue. Other examples are also possible.

After the server system causes the mobile device to provide pressure data, the server system may receive the pressure data from the mobile device. As discussed, the pressure data may be in accordance with measurement(s) by barometer(s) of the mobile device and may indicate a pressure change.

Finally, at block 506, method 500 may involve, based on the received pressure data indicating the pressure change and representing air pressure in the building while the mobile device is stationary, detecting that a state of an air-conditioning system in the building has changed In line with the discussion above, analysis of pressure data from a stationary mobile device could help detect that the state of the air-conditioning system has changed. In particular, if the pressure measurement(s) are performed while the mobile device is stationary and those measurement(s) indicate a pressure change, this means that the pressure change did not occur due to any movement by the mobile device, but may have occurred due to a change in the state of the air-conditioning system in the building. Thus, the server system could advantageously use this information as basis for the detection at issue.

Here again, the server system could determine in various ways that the state of the air-conditioning system changed at a particular time or a particular time range and/or whether the change in state of the air-conditioning system involves the air-conditioning system being switched on or being switched off. The server system could do so as described above.

In a further aspect, the server system could evaluate pressure data from other stationary mobile device(s) in the building to verify the detection at issue. In particular, the server system could cause multiple mobile device(s) in that building that have been detected as stationary to respectively provide pressure data substantially at the same time. And if the pressure data from each stationary mobile device respectively indicates a pressure change, the server system could use such information as basis for verifying or otherwise detecting that the state of the air-conditioning system in the building changed. Other aspects are also possible.

In some implementations, the server system could additionally or alternatively detect that the state of the air-conditioning system has changed based on an on-board analysis by the mobile device. In particular, the above-described blocks 502 and 504 may involve the mobile device providing derivatives of pressure and/or movement-related data, in accordance with a programmatic analysis by the mobile device, and the derivatives may enable the detection at issue. For instance, the mobile device could detect that a pressure change occurred while it is stationary, and may responsively provide an indication (e.g., to the server system) of such a detection. In turn, the server system could use this indication as basis for detecting that the state of an air-conditioning system has changed. Other examples are also possible.

Figure 6:
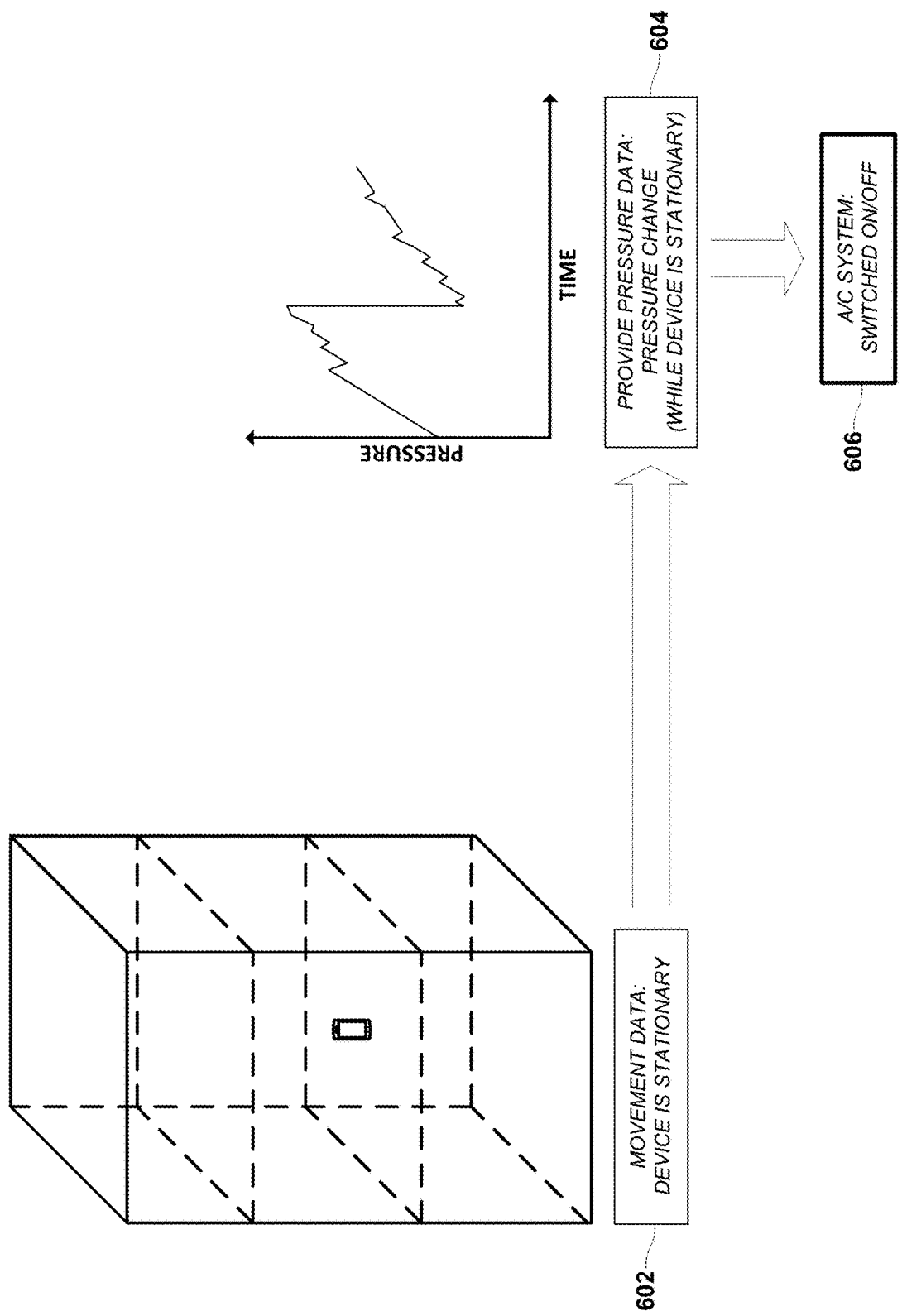
FIG. 6 illustrates the second approach for detecting that a state of an air-conditioning system in a building has changed, in accordance with an example implementation.
Figure 7:
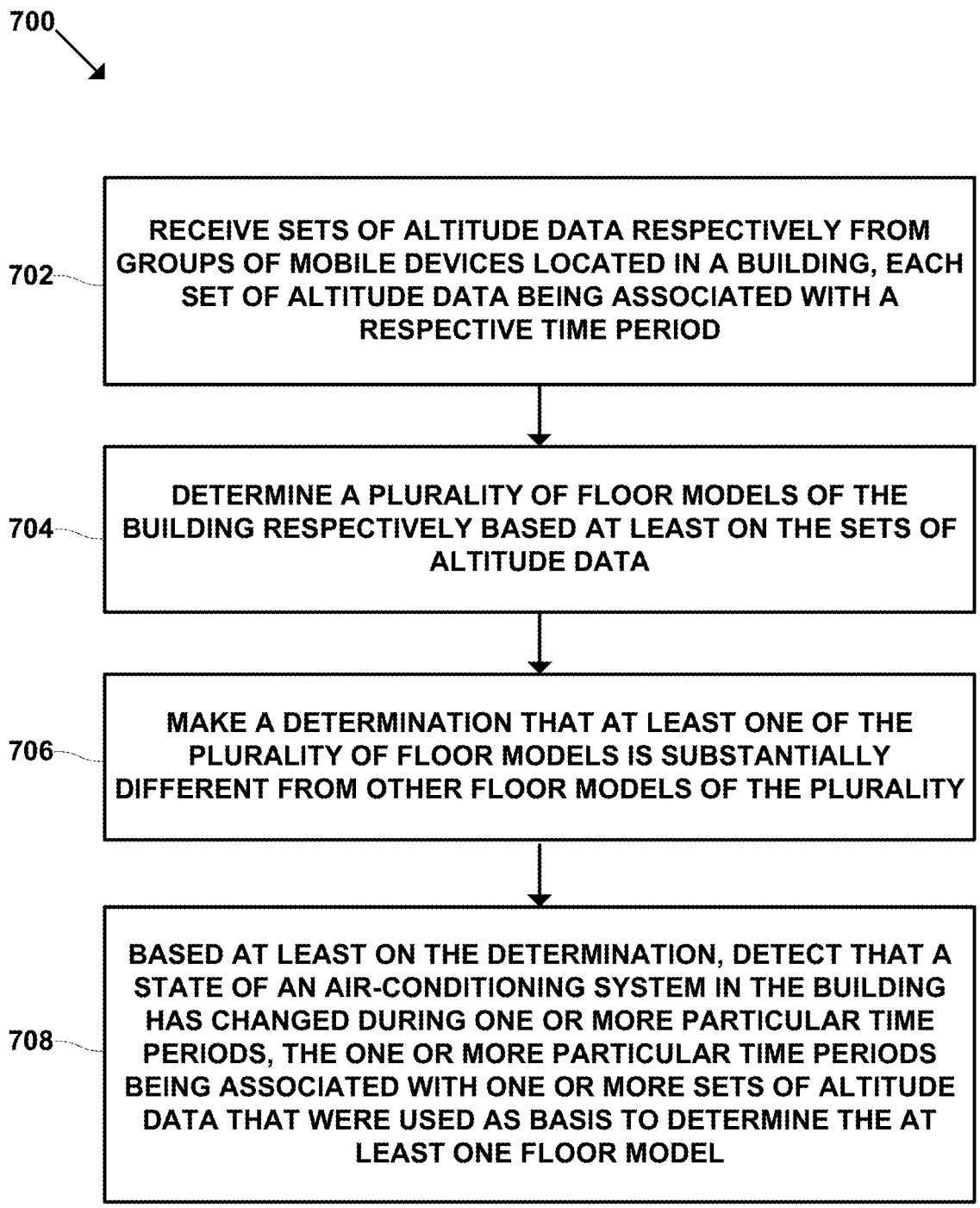
FIG. 7 is an example flowchart for a third approach to detect that a state of an air-conditioning system in a building has changed, in accordance with an example implementation.

FIG. 6 next visually illustrates the second approach for detecting that a state of an air-conditioning system in a building changed. As shown, movement data 602 from the mobile device may indicate that the mobile device is stationary. Given that the mobile device is detected as being stationary, the mobile device may responsively (e.g., automatically or upon request) provide pressure data 604 indicating air pressure in the building while the mobile device is stationary. And because the pressure data 604 may indicate that a pressure change occurred while the mobile device was stationary, a detection 406 can be made that the state of the air-conditioning system changed. Other illustrations are also possible.

iii. Third Approach: Analyzing Sets of Altitude Data from Mobile Device Groups to Detect that a State of an Air-Conditioning System has Changed FIG. 7 is a flowchart illustrating yet another method 700 for detecting that a state of an air-conditioning system has changed. Here again, for sake of simplicity, method 700 is described herein as being performed by a server system.

At block 702, method 700 may involve receiving sets of altitude data respectively from groups of mobile devices located in a building, each set of altitude data being associated with a respective time period.

As discussed, the crowdsourcing process may involve the server system collecting altitude data from numerous mobile devices in a building over time. As noted, altitude data may represent altitude(s) of a mobile device or may take the form of pressure data representing pressure measurements that can then be used to determine altitude(s) and/or altitude changes. In either case, an instance of altitude data could be associated with certain time(s) (e.g., timestamped) to represent, for instance, time(s) that pressure measurements were made, time(s) that the altitude data was generated, and/or time(s) that the altitude data was provided to and/or received by the server system, among other options.

Given this, the server system could cluster received altitude data according to time periods based on time(s) respectively associated with the altitude data. For example, a group of mobile devices in the building could provide altitude data having associated times that fall within a certain time period, and the server system could cluster that altitude data into a set associated with that time period. And another group of mobile devices in the building could provide other altitude data having associated times that fall within another time period, and the server system could cluster that altitude data into another set associated with that other time period, and so on.

In this regard, the time periods at issue could be arranged in various ways without departing from the scope of the present disclosure. For example, the time periods could be pre-defined (e.g., based on manual engineering input) and/or could be established according to a pseudo-random process, among other options. In either case, any feasible number of time periods (and thus altitude data sets) could be defined in this approach. Also, time periods may have the same respective durations as one another. Alternatively, one or more of the time periods could have respective durations that are different from respective durations of other time periods(s). Moreover, the time periods may be non-overlapping with one another. Alternatively, one or more of the time periods could respectively at least partially overlap with one or more other time periods.

Furthermore, the mobile device groups that respectively provide the altitude data sets may vary depending on how the time periods at issue are defined (e.g., depending on which and/or how many mobile devices are in the building respectively during each time period). For example, the groups may end up including different mobile devices. Alternatively, one or more of the groups may include at least some of the same mobile device(s) as other group(s). Also, the groups may end up including the same number of mobile devices as one another. Alternatively, one or more of the groups may respectively include a number of mobile devices that is different from the number of mobile devices included in other group(s). Other examples are also possible.

At block 704, method 700 may involve determining a plurality of floor models of the building respectively based at least on the sets of altitude data.

According to the third approach, the server system could use each set of altitude data (perhaps in combination with other data) respectively to generate a floor model of the building. And when a floor model is generated based on a set of altitude data, this generated floor model could be associated with the time period that is associated with the set of altitude data at issue.

In any case, a given floor model could be any feasible representation of characteristics of floor(s) in the building. For instance, a given floor model could indicate respective altitude(s) of floors in the building and/or the number of floors in the building, among other options. Example techniques for generating such floor model(s) are described in more detail in the following commonly assigned applications: (i) International Patent Cooperation Treaty (PCT) patent application Serial No. PCT/EP2018/063936, filed on May 28, 2018 and entitled "Multilevel Altitude Maps," the entire contents of which are herein incorporated by reference; and (ii) European patent application Serial No. 19155424.5, filed on Feb. 5, 2019 and entitled "Determining of Absolute Altitudes of Floors of a Structure," the entire contents of which are herein incorporated by reference. Other techniques are also possible.

At block 706, method 700 may involve making a determination that at least one of the plurality of floor models is substantially different from other floor models of the plurality.

Although this feature is described herein in the context of one floor model being different from the other floor models, it should be understood that more than one floor model may be different from the other floors models, which could enable detection of multiple times at which a state of an air-conditioning system has changed as further described herein.

Generally, the server system could determine in various ways that one of the generated floor models is substantially different from the rest. For instance, the server system could determine that the number of floors indicated by a particular floor model (e.g., two floors) is different from the number of floors respectively indicated by the other floor models (e.g., three floors). Additionally or alternatively, the server system could determine that at least some floor altitude(s) indicated by a particular floor model are different from altitudes of corresponding floors indicated by the other floor models.

In a specific example, the particular floor model may indicate (e.g., for a three-floor building) an altitude range of 0 to 2.1 meters for a first floor, an altitude range of 2.4 to 6.6 meters for a second floor, and an altitude range of 6.7 to 11 meters for a third floor. In contrast, the other floor models may indicate an altitude range of 0 to 3 meters for the first floor, an altitude range of 3.1 to 6 meters for the second floor, and an altitude range of 6.1 to 9 meters for the third floor. Thus, the server system could determine that the respective floor altitudes of the first, second, and third floors as indicated by the particular floor model are different from respective altitudes of corresponding floors as indicated by the other floor models. Other examples are also possible.

Finally, at block 708, method 700 may involve, based at least on the determination, detecting that a state of an air-conditioning system in the building has changed during one or more particular time periods, the one or more particular time periods being associated with one or more sets of altitude data that were used as basis to determine the at least one floor model.

In line with the discussion above, if one of the generated floor models is substantially different from the rest, this may serve as an indication that the set of altitude data used for generating the floor model at issue may have at least some inaccurate altitude data, possibly due to a change in the state of the air-conditioning system during the particular time period associated with this set of altitude data. Thus, the server system could use the determination of block 706 as basis to detect that the state of the air-conditioning system changed during the particular time period. And if more than one floor model is different from the rest, the server system could detect such a state change respectively for the time periods associated with those different floor models. In this regard, the server system could determine in various ways whether the air-conditioning system was switched on or off during a particular time period.

For example, the server system could determine whether the air-conditioning system was switched on or off based on characteristics of the "different" floor model associated with the particular time period, because such characteristics may predictably vary according to whether the air-conditioning system was switched on or off. For instance, if the different floor model indicates a number of floors that is greater than in other floor models, then the server system could use this information to determine that the air-conditioning system was switched on during the particular time period. Whereas, if the different floor model indicates a number of floors that is lesser than in other floor models, then the server system could use this information to determine that the air-conditioning system was switched off during the particular time period. In another instance, if the different floor model indicates floor heights for certain floor(s) that are higher than those indicated by other floor models for those same floor(s), then the server system could use this information to determine that the air-conditioning system was switched on during the particular time period. Whereas, if the different floor model indicates floor heights that are lower than those indicated by other floor models for those same floor(s), then the server system could use this information to determine that the air-conditioning system was switched off during the particular time period.

In another example, the server system could evaluate altitude data from a mobile device to determine whether the air-conditioning system was switched on or off. This mobile device may be from the group that provided the altitude data set used as basis for generating the different model. And the altitude data received from this mobile device may indicate or otherwise relate to a pressure change, which may have occurred due to the change in state of the air-conditioning system. If the server system determines that the pressure change is positive, then the server system may determine that the air-conditioning system has been switched on. Whereas, if the server system determines that the pressure change is negative, then the server system may determine that the air-conditioning system has been switched off. Other examples are also possible.

In some situations, the server system could detect that a change in the state of the air-conditioning system occurred substantially during a transition from one time period to another, such as at a time between time period, at the end of a certain time period, or at a beginning of a following time period. For instance, a time period A may be associated with a particular floor model, and a time period B that follows time period A in time (e.g., spans a duration immediately after the end of time period A) may be associated with a different floor model. Given that the two substantially adjacent time periods A and B are respectively associated with different floor models, this could serve as an indication that the air-conditioning system was in one state during one of the time periods and in another state during the other time period, thereby further indicating that the state of the air-conditioning system changed during a transition between time periods A and B. As such, if the server system determines a difference between floor models associated with substantially adjacent or otherwise consecutive time periods, the server system could responsively detect that the change in state at issue occurred during a transition between those time periods.

In a more specific example, days could be respectively divided into twenty-four time periods, with each time period respectively spanning one hour. In this example, the server system might encounter, with respect to ten time periods between 7 AM and 5 PM, a first group of ten floor models that are the same or similar to one another. And the server system may encounter, with respect to fourteen time periods between 5 PM and 7 AM (e.g., spanning from one day to the next), a second group of fourteen floor models that are the same or similar to one another, but are substantially different from the floor models of the first group. Given this, the server system could determine that a state of the air-conditioning changed at 7 AM and at 5 PM in accordance with the change in floor models respectively at those "transition" times. Other examples are also possible.

Figure 8:
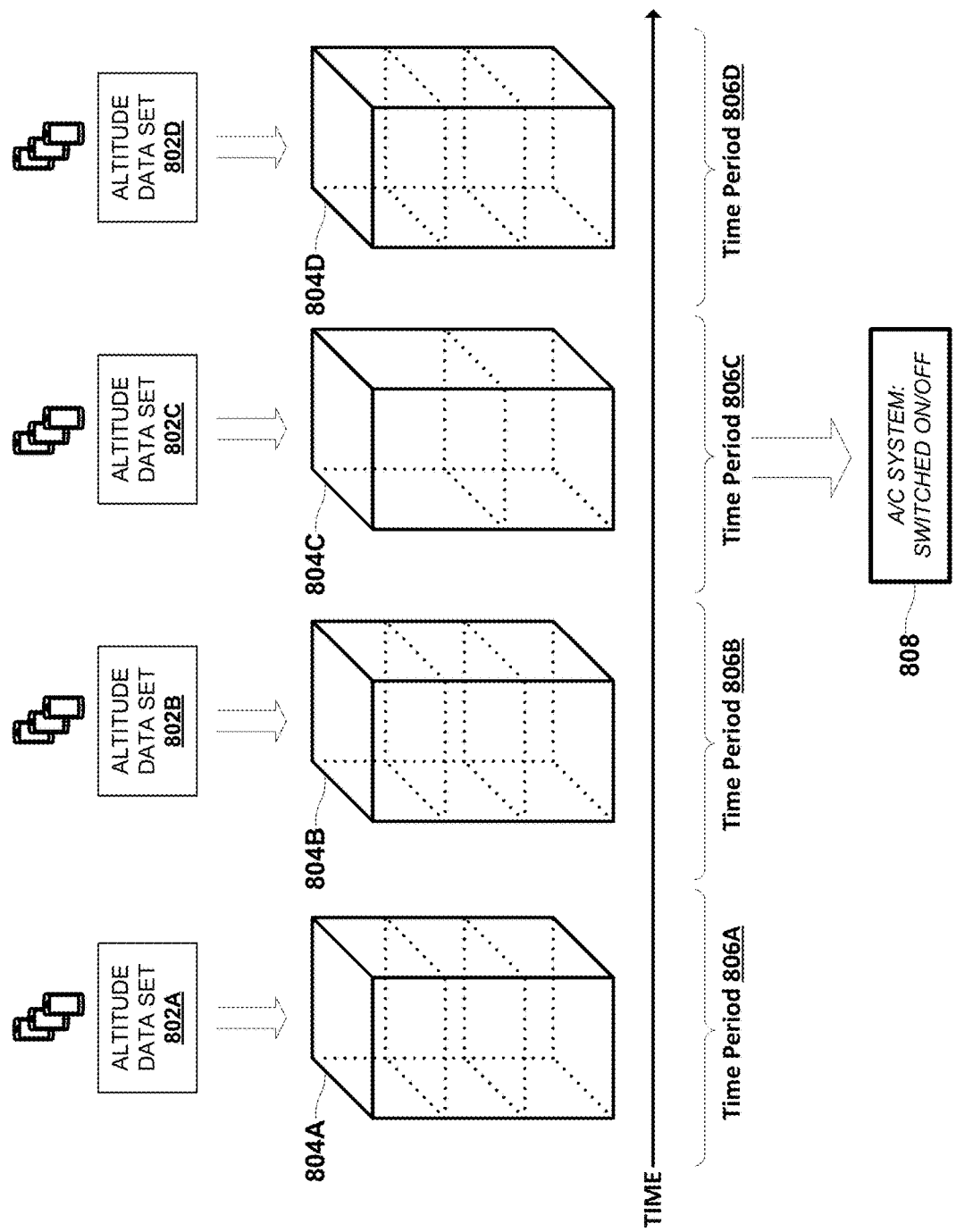
FIG. 8 illustrates the third approach for detecting that a state of an air-conditioning system in a building has changed, in accordance with an example implementation.

FIG. 8 next visually illustrates the third approach for detecting that a state of an air-conditioning system in a building changed. As shown, altitude data sets 802A to 802D may be respectively received from groups of mobile devices. Altitude data set 802A may be associated with time period 806A and may be use as basis for generating floor model 804A of the building, altitude data set 802B may be associated with time period 806B and may be use as basis for generating floor model 804B of the building, altitude data set 802C may be associated with time period 806C and may be use as basis for generating floor model 804C of the building, and altitude data set 802D may be associated with time period 806D and may be use as basis for generating floor model 806D of the building. Moreover, as shown, floor model 804C indicates a number of floors (e.g., 2) that is different from the number of floors (e.g., 3) indicated by the other floor models 804A, 804B, and 804D. Thus, this difference could be used as basis for a detection 808 that the state of the air-conditioning system in the building has changed during the time period 806C. Other illustrations are also possible.

iv. Using the Disclosed Approaches in Combination to Detect that a State of an Air-Conditioning System has Changed Generally, any combination of the above-described approaches could be used together in any feasible manner to detect that a state of an air-conditioning system has changed. This may involve, for instance, using one of the approaches to verify accuracy of the outcome of one of the other approaches, thereby ensuring that the detection at issue is trustworthy.

By way of example (and without limitation), the server system could perform both method 300 and method 500. And if the outcome of both methods involve a detection that the state of the air-conditioning system changed at a particular time, then the server system could designate such a detection as being trustworthy. But if the outcomes at issue are different from one another, then the server system could designate such a detection as being not trustworthy.

Whether the server system uses one or multiple approaches to detect that a state of an air-conditioning system has changed, the server system could perform various operation(s) according to such a detection. For example, the server system could store a record (e.g., in database 108) indicating the detection at issue, especially if the server system determined that the detection is trustworthy. Additionally or alternatively, the server system could send a message to another entity, to inform the entity about the detection. Other examples are also possible.

v. Determining an Operating Pattern of the Air-Conditioning System

In some implementations, the server system could use outcome(s) of any of the above-described approaches so as to determine an operating pattern of an air-conditioning system. The operating pattern may indicate time(s) that the air-conditioning system was on and/or is expected to be on, and/or time(s) that that the air-conditioning system was off and/or is expected to be off.

For instance, one or more of methods 300, 500, and/or 700 may be respectively performed one or more times, so as to detect or more instances of the air-conditioning system's state changing. For example, the server system could perform methods 300 and/or 500 with respect to one or more mobile devices, and may in turn detect one or more times when the air-conditioning system is respectively switched on and/or off. Additionally or alternatively, the server system could perform method 700 once or repeatedly to determine time(s) when the air-conditioning system is respectively switched on and/or off. In this way, the server system could effectively collect data indicating "on" and "off" times of the air-conditioning system.

Given such data about "on" and "off" times of the air-conditioning system, the server system could determine the operating pattern. For example, the server system could record the time(s) when the air-conditioning system was detected as being on and/or the time(s) when the air-conditioning system was detected as being off, thereby resulting in a record of the air-conditioning system's actual operating system. Additionally or alternatively, the server system could apply any currently-known and/or future-developed statistical analysis techniques so as to effectively evaluate trends in the data and thus determine time(s) when the air-conditioning system is expected to be on and/or the time(s) when the air-conditioning system is expected to be off, thereby resulting in a record of the air-conditioning system's expected operating system.

vi. Controlling Collection and/or Use of Crowdsourced Data

As noted, the present disclosure could help improve accuracy of position estimates in an indoor positioning solution. To help facilitate this improvement, the server system could control collection and/or use of crowdsourced data (e.g., as part of the crowdsourcing process) based on the determined operating pattern of the air-conditioning system and/or based on a single detection of the air-conditioning system being switched on or off, among other options.

For example, the server system could collect crowdsourced data from mobile device(s) in a building at time(s) when an operating pattern indicates that an air-conditioning system in the building is or is expected to be on. In contrast, the server system could disable collection crowdsourced data from mobile device(s) in the building at time(s) when the operating pattern indicates that the air-conditioning system in the building is or is expected to be off.

In another example, the server system could generate or update a radio map based on crowdsourced data associated with time(s) when the air-conditioning system in the building was or was expected to be on, according to its determined operating pattern. In contrast, the server system could disregard, discard, and/or filter out crowdsource data associated with time(s) when the air-conditioning system in the building was or was expected to be off, according to its determined operating pattern.

In yet another example, if the server system detects an instance of the air-conditioning system being switched on, the server system could perform one or more of the following operations: use received pressure data (e.g., that enabled the "on" detection) to determine altitude(s) of a mobile device (e.g., as part of generation or updating of a radio map); use subsequent pressure data collected after the detection (while the air-conditioning system is still on) to determine altitude(s) of a mobile device (e.g., as part of generation or updating of a radio map); enable subsequent collection in the building of further pressure data while the air-conditioning system remains switched on; use radio measurements collected while the air-conditioning system is on for generating or updating of the radio map; and/or enable subsequent collection in the building of further radio measurements while the air-conditioning system remains on.

Whereas, if the server system detects an instance of the air-conditioning system being switched off, the server system could perform one or more of the following operations: discard or filter out received data (e.g., pressure data used for the detection) and/or further data that is subsequently collected in the building while the air-conditioning system remains switched off; disable subsequent collection in the building of further (e.g., pressure) data while the air-conditioning system remains switched off; discard or filter out radio measurements collected in the building while the air-conditioning system is off; and/or disable subsequent collection in the building of further radio measurements while the air-conditioning system remains switched off. Other examples are also possible.

vii. Additional Use Cases

In a further aspect, the server system could use the operating pattern of an air-conditioning system in a building as basis to determine a building type for that building.

In practice, buildings could be of various types, perhaps depending on how their respective space(s) are being utilized. For instance, building types may include residential buildings, hospital buildings, government buildings, office buildings, theater buildings, and/or museum buildings, among numerous other examples. And different types of buildings may use their air-conditioning systems differently. For example, residential buildings tend to have their air-conditioning systems on at most times of the day, but office buildings tend to have their air-conditioning systems on only at certain time periods.

Given this, operating patterns of air-conditioning systems in buildings could be learned over time, and used as basis for determine building types. For example, the server system could determine an operating pattern of an air-conditioning in a building, as described above. Also, the server system could have stored thereon or otherwise have access to information indicating common air-conditioning operating pattern respectively for various building types. So, if the server system then determines that the determined operating pattern substantially matches a common operating pattern of a particular type of building, the sever system could designate that building (i.e., where the air-conditioning system is deployed) as being of that particular type. Other examples are also possible.

In yet a further aspect, when the server system determines or otherwise collects certain information in accordance with the present disclosure, the server system could use, store, provide, and/or manipulate this information in any feasible manner. For example, the server system could transmit a determined air-conditioning operating pattern and/or building type of a building to an entity, such as to a mobile device or a software application, among others. In another example, the server system could incorporate or otherwise integrate information into map data (e.g., geographic database 1000 described herein), so that the map data e.g., indicates air-conditioning operating pattern(s) and/or building type(s) respectively for various buildings. In some cases, an air-conditioning operating pattern of a building might correspond to operating hours of the building and/or might indicate times that the building is active or inactive, thereby enabling the server system to additionally or alternatively incorporate or otherwise integrate such information into the map data. In this way, the present disclosure could also help (e.g., user(s) of the map data) learn more information about buildings via the map data. Other examples are also possible.

III. EXAMPLE HARDWARE AND SOFTWARE

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
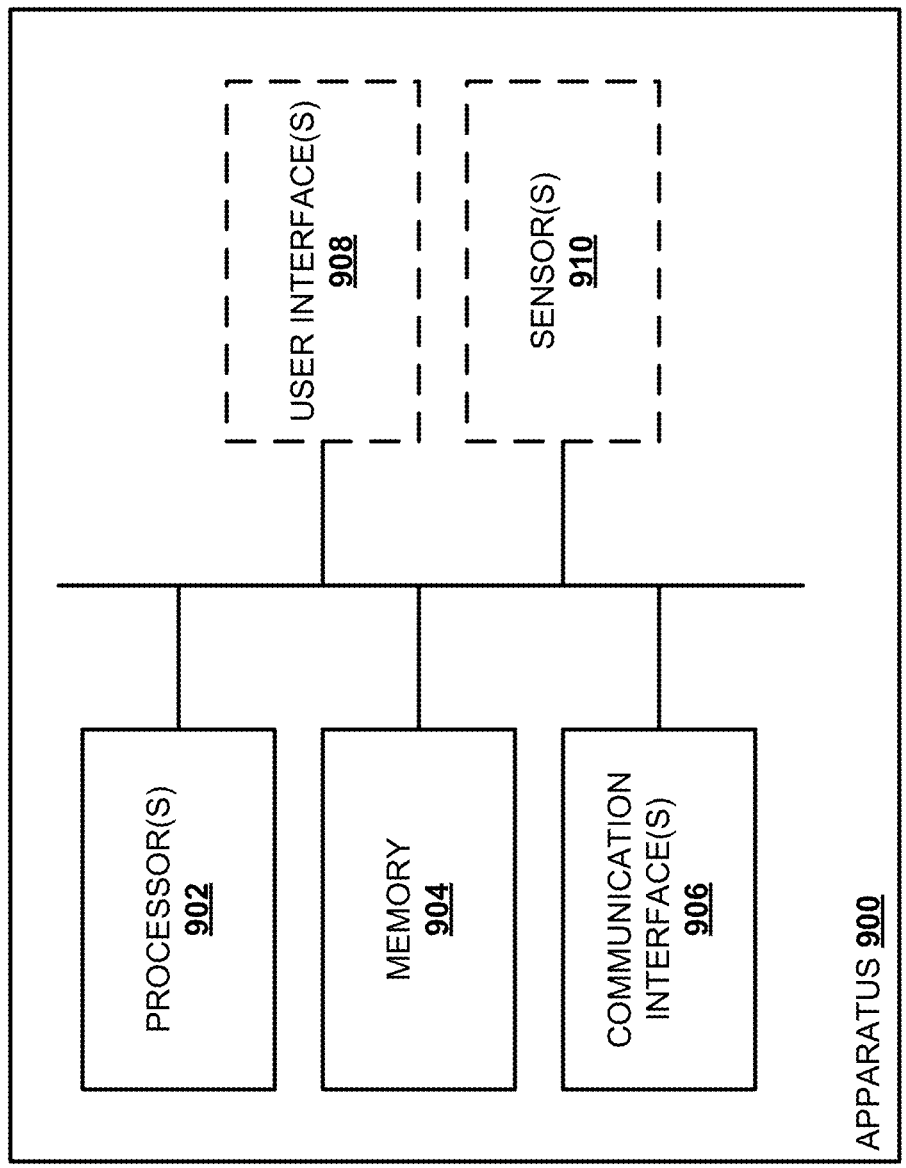
FIG. 9 illustrates an example apparatus, in accordance with an example implementation.

FIG. 9 is a schematic block diagram of an apparatus 900 according to an example embodiment. The apparatus 900 could, for instance, represent a server (e.g., server system 102) or a mobile device (e.g., one of the mobile devices 106), among other options. Moreover, the apparatus 900 could take the form of or otherwise be part of a system, such as any of those described herein.

As shown, apparatus 900 could include processor(s) 902, a memory 904 (e.g., database 108), communication interface(s) 906, an (optional) user interface(s) 908, and (optional) sensor(s) 910. Some or all of the components of the apparatus 900 may be connected via a bus (or other mechanism) and/or be combined into one or more modules.

Processor(s) 902 could have numerous functions, such as controlling the memory 904, communication interface(s) 906, the user interface(s) 908, and/or the sensor(s) 910 in any feasible manner currently known or developed in the future. For example, the memory 904 could include or otherwise contain computer program code (program instructions), and the processor(s) 902 may be configured to execute the program code to cause the apparatus 900 to perform and/or control operations, such as any of those described herein and/or other operations. Thus, apparatus 900 and/or processor(s) 902 could be referred to as carrying out such operations.

Moreover, processor(s) 902 (and also any other processor(s) mentioned herein) may be processor(s) of any suitable type. For example (and without limitation), processor(s) 902 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 904 could also take various form without departing from the scope of the present disclosure. In particular, memory 904 could be separate from processor(s) 902. Additionally or alternatively, memory 904 may be part of or otherwise integrated with one or more of the processor(s) 902. In this case, memory 904 may be fixed to the from processor(s) 902 or may be at least partially removable from the processor(s) 902. In any case, the memory 904 be or take the form of volatile and/or non-volatile memory, and could include program memory, working memory, and/or data memory, among others.

By way of example (and without limitation), memory 904 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 904 may additionally or alternatively include an operating system for processor(s) 902 and/or firmware for apparatus 900. Further, memory 904 could additionally or alternatively be used by processor(s) 902 when executing an operating system and/or computer program. Moreover, memory 904 could additionally or alternatively store data, such as any types, sets, instances, and/or samples of data described herein. Other examples are also possible.

Further, communication interface(s) 906 could enable the apparatus 900 to communicate with other entities. The communication interface(s) 906 may, for instance, include a wireless interface (e.g. a cellular radio communication interface and/or a WLAN interface) and/or wire-bound interface (e.g. an IP-based interface, for instance to communicate with entities via the Internet).

Yet further, user interface(s) 908 could be any device(s) for presenting and/or receiving information. For instance, user interface(s) 908 include display device(s), audio device(s) or the like for visually and/or audibly providing information (e.g., to a user). Additionally or alternatively, user interface(s) 908 could include input device(s) (e.g. a keyboard, keypad, touchpad, mouse, etc.) for receiving information (e.g., based on input provided by a user).

Finally, sensor(s) 910 could include any type(s) of sensor(s) currently known and/or developed in the future. For example, sensor(s) 910 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 900 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

IV. EXAMPLE GEOGRAPHIC DATABASE

Figure 10:
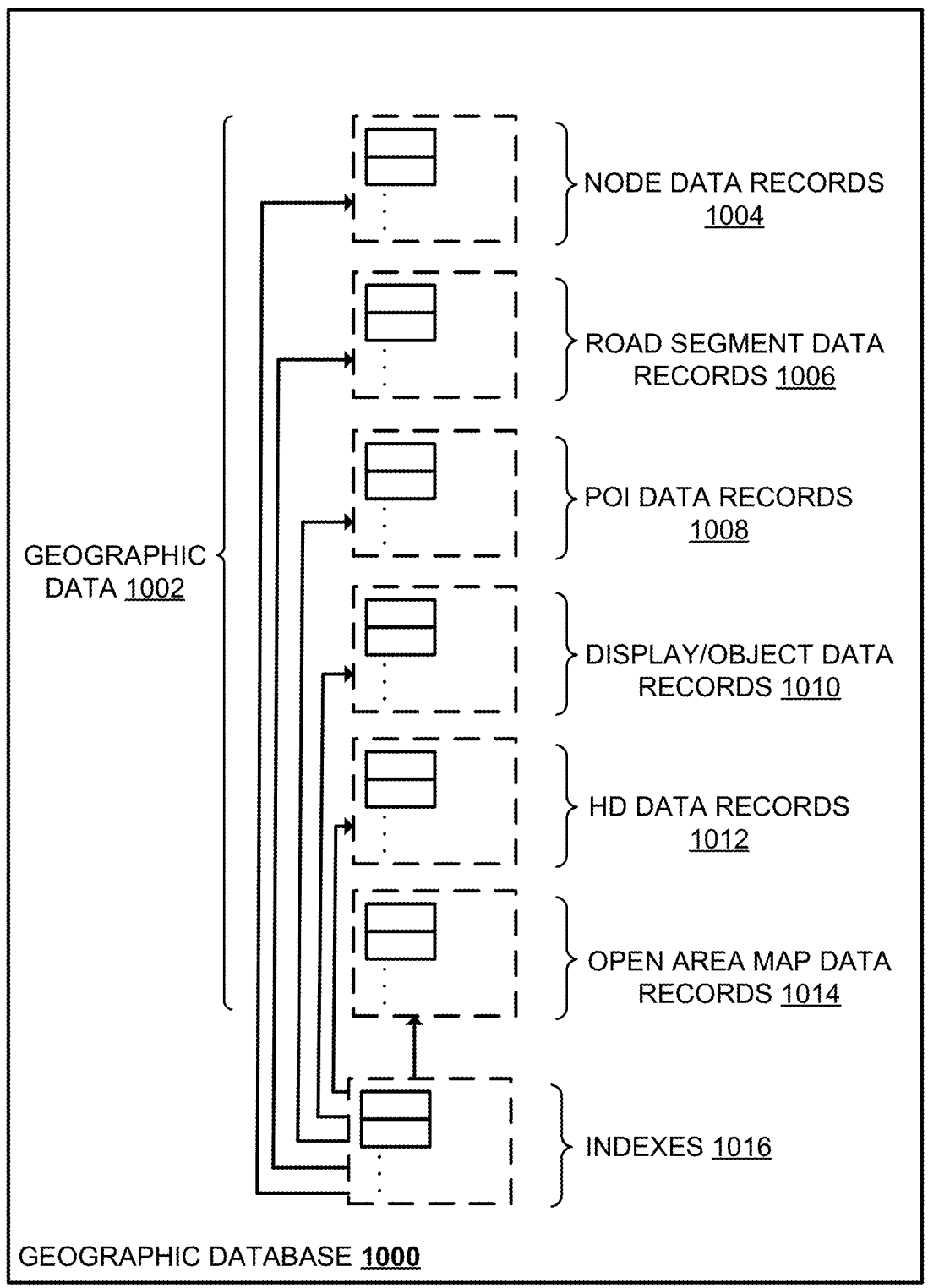
FIG. 10 illustrates a diagram of a geographic database, in accordance with an example implementation.

FIG. 10 illustrates a diagram of a geographic database 1000, according to an example implementation. Geographic database 1000 could be included within, integrated with, or be separate from another database, data storage device, memory, or the like described herein (e.g., memory 904). Additionally or alternatively, geographic database 1000 could be stored on or otherwise made accessible to any entity described herein without departing from the scope of the present disclosure. Moreover, although certain aspects of the geographic database are described in the context of outdoor mapping and/or outdoor navigation-related services, it should be understand that some or all such aspects could extend to apply in the context of indoor mapping and/or indoor navigation-related services.

More specifically, the geographic database 1000 may include geographic data 1002 used for (or configured to be compiled to be used for) mapping and/or navigation-related services. For instance, the geographic database 1000 may include high resolution or high definition (HD) mapping data that provide centimeter-level or better accuracy of map features. By way of example, the geographic database 1000 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 1012) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 1000, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 1000.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 1000 may follow certain conventions. For example, links might not cross themselves and might not cross each other except at a node. Also, there may be no duplicated shape points, nodes, or links. Two links that connect each other may have a common node. In the geographic database 1000, overlapping geographic features may be represented by overlapping polygons. When polygons overlap, the boundary of one polygon may cross the boundary of the other polygon. In the geographic database 1000, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 1000 may be stored as a hierarchical or multi-level tile-based projection or structure. More specifically, in one embodiment, the geographic database 1000 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 1000 may include node data records 1004, road segment or link data records 1006, Points of Interest (POI) data records 1008, display/object data records 1010, HD mapping data records 1012, open area map data records 1014, and indexes 1016, for example. More, fewer or different data records can be provided. For example, other data records can include cartographic data records, routing data, and/or maneuver data. Further, the indexes 1016 may improve the speed of data retrieval operations in the geographic database 1000. For instance, the indexes 1016 may be used to quickly locate data without having to search every row in the geographic database 1000 every time it is accessed. For example, in one embodiment, the indexes 1016 can be a spatial index of the polygon points associated with stored feature polygons.

In exemplary embodiments, the road segment data records 1006 may be links or segments representing roads, streets, or paths, as can be used in a calculated or recorded route information for determination of one or more personalized routes. The node data records 1004 may be end points corresponding to the respective links or segments of the road segment data records 1006. The road link data records 1006 and the node data records 1004 may represent a road network, such as used by vehicles, cars, and/or other entities. Alternatively, the geographic database 1000 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 1000 can include data about the POIs and their respective locations in the POI data records 1008. The geographic database 1000 can also include data about places, such as cities, towns, or other communities, and other geographic features, such as bodies of water, mountain ranges, etc. Such place or feature data can be part of the POI data records 1008 or can be associated with POIs or POI data records 1008 (such as a data point used for displaying or representing a position of a city). Other examples are also possible.

In some implementations, the geographic database 1000 can include display/object data records 1010 for storing machine-readable visual representations and map data decoded from the visual representations and their respective properties. In addition, the display/object data records 1010 can store post-processing rule sets for correcting and/or reducing the uncertainties in the display/object data decoded from clustered machine-readable visual representations. The display/object data records 1000 can also store data selection rules (e.g., in a map data extension layer) for selecting from among multiple sets of readings of a machine-readable visual representation. The display/object data records 1000 can also store confidence or accuracy determinations for the decoded map data. By way of example, the display/object data records 1000 can be associated with one or more of the node records 1004, road segment records 1006, and/or POI data records 1008 to support uses cases such as enhanced mapping user interfaces (UIs), autonomous driving, dynamic map updates, etc. In some cases, the display/object data records 1010 may be stored as a data layer of the hierarchical tile-based structure of the geographic database 1000 according to the various embodiments described herein.

In some implementations, as discussed above, the HD mapping data records 1012 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 1000 can be maintained by a content provider in association with a services platform (e.g., a map developer). The map developer can collect geographic data to generate and/or enhance the geographic database 1000. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 1000 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 1000 could additionally or alternatively include open area map data record(s) 1014 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 1000). The geographic map may be or include geographic data (e.g., any feasible data from records 1004-1012) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 1000 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

V. CONCLUSION

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
causing, by one or more processors, a mobile device to provide pressure data representing air pressure in a building while the mobile device is stationary;
receiving, by the one or more processors, the pressure data from the mobile device, wherein the received pressure data indicates a pressure change; and
based on the received pressure data indicating the pressure change and representing air pressure in the building while the mobile device is stationary, detecting, by the one or more processors, that a state of an air-conditioning system in the building has changed,
wherein detecting that the state of the air-conditioning system in the building has changed comprises detecting that the air-conditioning system has been switched on or switched off, and
wherein detecting that the state of the air-conditioning system in the building has changed occurs as part of determining an operating pattern of the air-conditioning system, the operating pattern indicating (i) times associated with the air-conditioning system being on and (ii) times associated with the air-conditioning system being off.

2. The method of claim 1, further comprising:
detecting, by the one or more processors, that the mobile device is stationary in accordance with one or more measurements by one or more inertial sensors of the mobile device,
wherein causing the mobile device to provide pressure data is responsive to detecting that the mobile device is stationary.

3. The method of claim 1, wherein the received pressure data is based on pressure measurements, performed by the mobile device, of air pressure in the building while the mobile device is stationary.

4. The method of claim 1, wherein the received pressure data is in accordance with one or more measurements by one or more barometers of the mobile device.

5. The method of claim 1, further comprising:
applying, by the one or more processors, a pseudo-random process to determine times during which to respectively cause one or more mobile devices to provide pressure data,
wherein causing the mobile device to provide pressure data is in accordance with application of the pseudo-random process.

6. The method of claim 1, wherein causing the mobile device to provide pressure data comprises causing the mobile device to provide pressure data for a particular time period.

7. The method of claim 1, wherein causing the mobile device to provide pressure data while the mobile device is stationary comprises causing the mobile device to provide pressure data outside of a crowdsourcing process, the crowdsourcing process being configured to cause the mobile device to provide pressure data when the mobile device has been detected as moving.

8. The method of claim 1,
wherein the received pressure data is associated with a particular time range during which the pressure change occurred, and
wherein detecting that the state of the air-conditioning system in the building has changed comprises detecting that the state of the air-conditioning system in the building has changed during the particular time range.

9. The method of claim 1, wherein the pressure change occurring while the mobile device is stationary indicates that the pressure change occurred due to the state of the air-conditioning system changing.

10. The method of claim 1, further comprising:
repeatedly performing the method, by the one or more processors and with respect to one or more mobile devices in the building, to determine the operating pattern of the air-conditioning system.

11. The method of claim 1, further comprising:
based at least on the determined operating pattern of the air-conditioning system, controlling, by the one or more processors, one or more of (i) crowdsourced collection of measurements in the building or (ii) use of measurements collected in the building for generating or updating of a radio map.

12. The method of claim 1, further comprising:
based at least on the determined operating pattern of the air-conditioning system, determining, by the one or more processors, a building type associated with the building.

13. The method of claim 7, wherein pressure data provided during the crowdsourcing process is candidate to be used for generating or updating of a radio map.

14. An apparatus comprising:
one or more processors;
a non-transitory computer readable medium; and
program instructions stored on the non-transitory computer readable medium and executable by the one or more processors to:
cause a mobile device to provide pressure data representing air pressure in a building while the mobile device is stationary;
receive the pressure data from the mobile device, wherein the received pressure data indicates a pressure change; and
based on the received pressure data indicating the pressure change and representing air pressure in the building while the mobile device is stationary, detect that a state of an air-conditioning system in the building has changed,
wherein detecting that the state of the air-conditioning system in the building has changed comprises detecting that the air-conditioning system has been switched on or switched off, and
wherein detecting that the state of the air-conditioning system in the building has changed occurs as part of determining an operating pattern of the air-conditioning system, the operating pattern indicating (i) times associated with the air-conditioning system being on and (ii) times associated with the air-conditioning system being off.

15. The apparatus of claim 14, wherein causing the mobile device to provide pressure data while the mobile device is stationary comprises causing the mobile device to provide pressure data outside of a crowdsourcing process, the crowdsourcing process being configured to cause the mobile device to provide pressure data when the mobile device has been detected as moving.

16. The apparatus of claim 14, wherein the pressure change occurring while the mobile device is stationary indicates that the pressure change occurred due to the state of the air-conditioning system changing.

17. The apparatus of claim 14, wherein the program instructions are further executable to:
based at least on the determined operating pattern of the air-conditioning system, control one or more of (i) crowdsourced collection of measurements in the building or (ii) use of measurements collected in the building for generating or updating of a radio map.

18. A non-transitory computer readable medium having stored thereon instructions executable by one or more processors to cause a mobile device or a server device to perform operations comprising:
causing a mobile device to provide pressure data representing air pressure in a building while the mobile device is stationary;
receiving the pressure data from the mobile device, wherein the received pressure data indicates a pressure change; and
based on the received pressure data indicating the pressure change and representing air pressure in the building while the mobile device is stationary, detecting that a state of an air-conditioning system in the building has changed,
wherein detecting that the state of the air-conditioning system in the building has changed comprises detecting that the air-conditioning system has been switched on or switched off, and
wherein detecting that the state of the air-conditioning system in the building has changed occurs as part of determining an operating pattern of the air-conditioning system, the operating pattern indicating (i) times associated with the air-conditioning system being on and (ii) times associated with the air-conditioning system being off.

* * * * *